(12) United States Patent
Shimura et al.

(10) Patent No.: US 8,846,257 B2
(45) Date of Patent: Sep. 30, 2014

(54) FUEL CELL SYSTEM AND ELECTRONIC DEVICE

(75) Inventors: Jusuke Shimura, Kanagawa (JP); Yoshiaki Inoue, Aichi (JP)

(73) Assignee: Sony Corporation, Tokyo (JP)

( * ) Notice: Subject to any disclaimer, the term of this patent is extended or adjusted under 35 U.S.C. 154(b) by 820 days.

(21) Appl. No.: 13/058,770

(22) PCT Filed: Jul. 29, 2009

(86) PCT No.: PCT/JP2009/063463
§ 371 (c)(1),
(2), (4) Date: Feb. 11, 2011

(87) PCT Pub. No.: WO2010/021231
PCT Pub. Date: Feb. 25, 2010

(65) Prior Publication Data
US 2011/0140547 A1 Jun. 16, 2011

(30) Foreign Application Priority Data

Aug. 18, 2008 (JP) .............................. P2008-209873
Sep. 11, 2008 (JP) .............................. P2008-233116

(51) Int. Cl.
*H01M 8/04* (2006.01)
*H01M 8/10* (2006.01)

(52) U.S. Cl.
CPC ...... *H01M 8/04365* (2013.01); *H01M 8/04731* (2013.01); *Y02E 60/523* (2013.01); *H01M 8/1011* (2013.01); *H01M 8/04559* (2013.01); *H01M 8/04589* (2013.01); *H01M 8/0432* (2013.01); *H01M 8/04753* (2013.01); *H01M 8/04201* (2013.01)
USPC ........... 429/428; 429/431; 429/432; 429/433; 429/443; 429/447

(58) Field of Classification Search
USPC .................. 429/428, 431, 432, 433, 443, 447
See application file for complete search history.

(56) References Cited

U.S. PATENT DOCUMENTS

| | | |
|---|---|---|
| 6,447,941 B1 | 9/2002 | Tomimatsu et al. |
| 6,590,370 B1 | 7/2003 | Leach |

(Continued)

FOREIGN PATENT DOCUMENTS

| | | |
|---|---|---|
| JP | 61-151970 | 7/1986 |
| JP | 63-168971 | 7/1988 |

(Continued)

OTHER PUBLICATIONS

International Search Report dated Oct. 27, 2009, for corresponding Patent Application PCT/JP2009/063463.

*Primary Examiner* — Patrick Ryan
*Assistant Examiner* — Julian Anthony
(74) *Attorney, Agent, or Firm* — K&L Gates LLP

(57) ABSTRACT

A fuel cell system that is able to perform power generation more stably than in the past regardless of external environment is provided. Based on a temperature of a power generation section detected by a temperature detection section, a supply amount of a liquid fuel from a fuel pump is adjusted, and therefore control in which the temperature of the power generation section becomes constant is performed. In addition, a fuel cell system that is able to perform power generation in a vaporization supply type fuel cell more stably than in the past is provided. A level of a power generation voltage supplied from the power generation section is raised by a boost circuit. In a control section, operation of the boost circuit is controlled using a given control table, and therefore control is performed on an output voltage and an output current supplied from the boost circuit to a load.

10 Claims, 30 Drawing Sheets

(56) References Cited

U.S. PATENT DOCUMENTS

| | | | |
|---|---|---|---|
| 6,764,780 B2 * | 7/2004 | Roberts et al. | 429/432 |
| 6,777,122 B2 * | 8/2004 | Okamoto | 429/425 |
| 7,993,795 B2 * | 8/2011 | Ishikawa | 429/507 |
| 2006/0222916 A1 | 10/2006 | Norimatsu et al. | |
| 2007/0059575 A1 | 3/2007 | Kan et al. | |
| 2007/0196700 A1 | 8/2007 | Chen et al. | |
| 2007/0259227 A1 | 11/2007 | Oishi et al. | |
| 2007/0264548 A1 | 11/2007 | Yagi et al. | |
| 2007/0292737 A1 | 12/2007 | Makita et al. | |
| 2009/0061266 A1 | 3/2009 | Nagasaki et al. | |
| 2009/0186257 A1 | 7/2009 | Sakai et al. | |

FOREIGN PATENT DOCUMENTS

| | | |
|---|---|---|
| JP | 2000-106201 | 4/2000 |
| JP | 2004-071260 | 3/2004 |
| JP | 2004-152741 | 5/2004 |
| JP | 2004-171813 | 6/2004 |
| JP | 2005-327583 | 11/2005 |
| JP | 2005-340174 | 12/2005 |
| JP | 2006-501798 | 1/2006 |
| JP | 2006-286321 | 10/2006 |
| JP | 2006-286408 | 10/2006 |
| JP | 2007-087736 | 4/2007 |
| JP | 2007-165148 | 6/2007 |
| JP | 2007-227336 | 9/2007 |
| JP | 2008-066275 | 3/2008 |
| JP | 2008-078068 | 4/2008 |
| JP | 2008-146950 | 6/2008 |
| JP | 2008-210566 | 9/2008 |
| JP | 2009-016311 | 1/2009 |
| JP | 2009-054546 | 3/2009 |
| JP | 2009-134885 | 6/2009 |
| JP | 2009-176483 | 8/2009 |
| JP | 2009-245641 | 10/2009 |
| WO | 2005/112172 | 11/2005 |
| WO | 2006/025321 | 3/2006 |

* cited by examiner

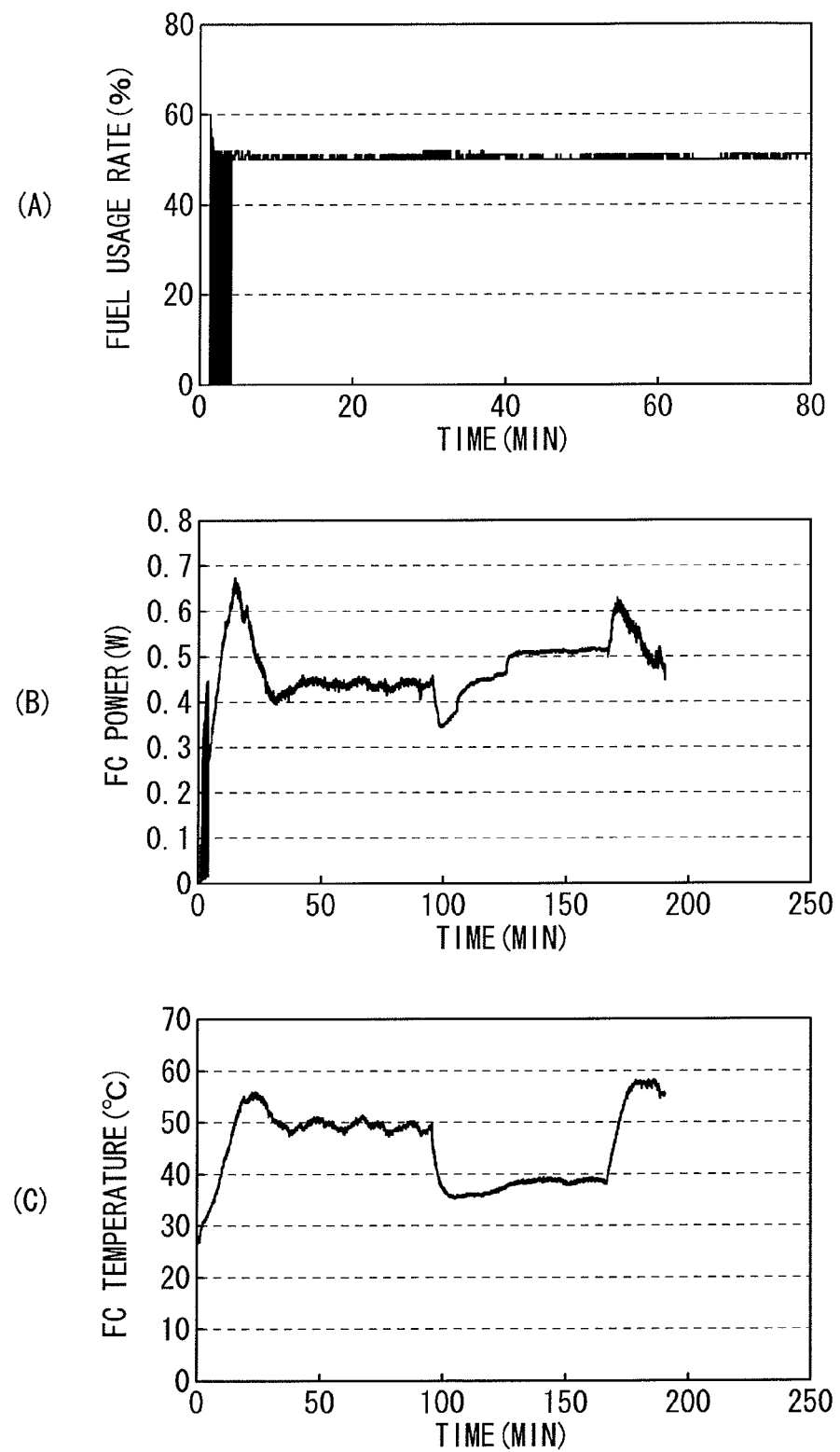
F I G. 20

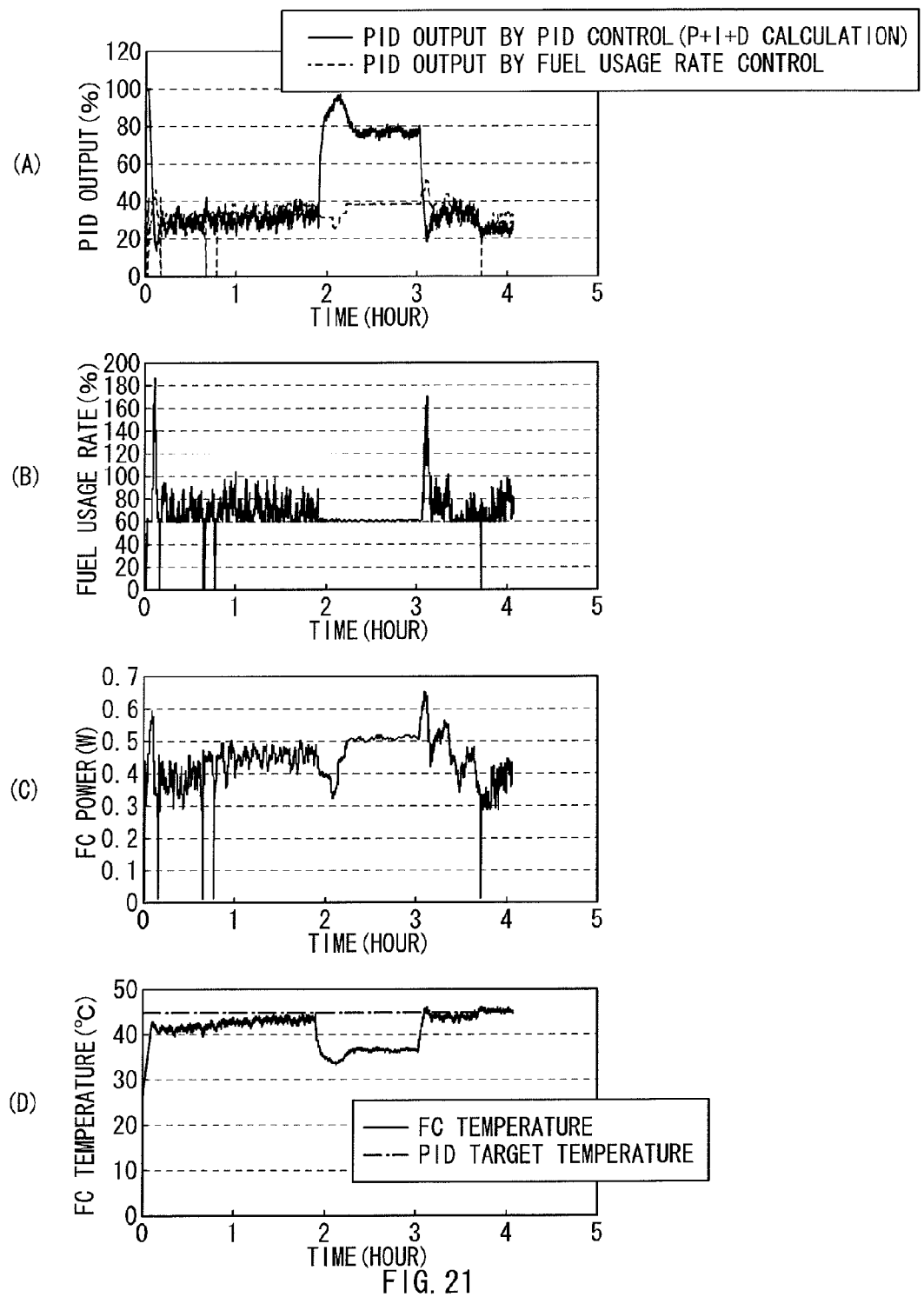
F I G. 21

| | Vref | HIGH | LOW |
|---|---|---|---|
| (A) | FC VOLTAGE | HIGH | LOW |

| | FC VOLTAGE | HIGH | LOW |
|---|---|---|---|
| (B) | FC CURRENT | LOW | HIGH |
| | FUEL SUPPLY AMOUNT | CONSTANT | CONSTANT |

| | FC VOLTAGE | FIXED | FIXED |
|---|---|---|---|
| (C) | FC CURRENT | LOW | HIGH |
| | FUEL CONVERSION EFFICIENCY | HIGH | LOW | ively used as an industrial power generation equipment and a household power generation equipment, or as a power source for an artificial earth satellite, a space ship or the like. Further, in recent years, the fuel cells have been progressively developed as a power source for a vehicle such as a passenger car, a bus, and a cargo truck. Such fuel cells are categorized into an alkali aqueous solution fuel cell, a phosphoric-acid fuel cell, a molten carbonate fuel cell, a solid oxide fuel cell, a direct methanol fuel cell and the like. Specially, a solid polyelectrolyte DMFC (Direct Methanol Fuel Cell) is able to provide a high energy density by using methanol as a fuel hydrogen source. Further, the DMFC does not need a reformer and thus is able to be downsized. Thus, the DMFC as a small mobile fuel cell has been progressively researched.

FUEL CELL SYSTEM AND ELECTRONIC DEVICE

CROSS REFERENCE TO RELATED APPLICATIONS

The present application is a National Stage of International Application No. PCT/JP2009/063463 filed on Jul. 29, 2009 and which claims priority to Japanese Patent Application No. JP 2008-209873 filed on Aug. 18, 2008 and JP 2008-233116 filed on Sep. 11, 2008, the entire contents of which are being incorporated herein by reference.

BACKGROUND

Fuel cells have high power generation efficiency and do not exhaust harmful matter, the fuel cells have been practically In the DMFC, an MEA (Membrane Electrode Assembly) as a unit cell in which a solid polyelectrolyte film is sandwiched between two electrodes, and the resultant is joined and integrated is used. One gas diffusion electrode is used as a fuel electrode (anode), and methanol as a fuel is supplied to the surface of such one gas diffusion electrode. As a result, the methanol is decomposed, hydrogen ions (protons) and electrons are generated, and the hydrogen ions pass through the solid polyelectrolyte film. Further, the other gas diffusion electrode is used as an oxygen electrode (cathode), and air as oxidant gas is supplied to the surface of the other gas diffusion electrode. As a result, oxygen in the air is bonded with the foregoing hydrogen ions and the foregoing electrons to generate water. Such electrochemical reaction results in generation of electro motive force from the DMFC.

Meanwhile, in a fuel cell used for mobile purposes, it is desired that the fuel cell stably perform power generation operation in any environment, such as indoors, outdoors in midwinter, inside an automobile at high midsummer temperatures, and inside a bag where heat release is difficult. Further, it is also desired that the fuel cell be able to follow sudden changes in the environment, such as the fuel cell suddenly being carried from inside a warm room to freezing outdoors. In this way, since suitable fuel supply amount for the fuel cell differs according to the temperature and humidity of the external environment, careful fuel supply control according to environment changes (fuel supply control in which the fuel supply amount is not excessive or insufficient) is desired.

In a case where the supply amount of fuel becomes excessive, the surplus fuel permeates to the oxygen electrode, thereby causing a phenomenon called crossover. The crossover phenomenon is a phenomenon in which the surplus fuel burns directly on the oxygen electrode, thus not only reducing usage efficiency of fuel and causing waste, but also carrying risk of causing burn injury to a user resulting from temperature rise. In addition, on the contrary, in a case where the fuel supply becomes insufficient, sufficient output is not able to be obtained, and there is a possibility that power supply to equipment connected to the fuel cell is stopped.

Thus, a method of controlling the fuel supply amount for the purpose of inhibiting excess and shortage in the fuel supply amount has been proposed (for example, Patent Document 1).

In fuel cell systems including a fuel cell such as the foregoing, there is a fuel cell system in which a power generation voltage and a power generation current (generated power) from the fuel cell charge a secondary battery and drive a load. Thereby, in such a fuel cell system, it is desired that the generated power from the fuel cell charges the secondary battery as efficiently as possible.

In Patent Document 2, a fuel cell system in which control is performed so that the power generation voltage value of the fuel cell is held constant using a DC/DC converter is proposed.

Patent Document

Patent Document 1: Japanese Unexamined Patent Application Publication No. 2007-227336
Patent Document 2: Japanese Unexamined Patent Application Publication No. 2006-501798

SUMMARY

In the fuel supply control in the foregoing Patent Document 1, two threshold values (an upper limit value and a lower limit value) are set for voltage and current. The fuel supply is stopped when the upper limit value is exceeded, whereas the fuel supply is resumed when the value falls below the lower limit value. According to the control method, the fuel supply is able to be controlled by voltage fluctuations during constant current power generation and by current fluctuations during constant voltage power generation.

However, in the control method, for example, there has been a problem that, in the case where the crossover phenomenon occurs, the situation is worsened. Specifically, for example, while the voltage decreases and falls below the lower limit value when fuel is insufficient during constant current control, since the voltage similarly decreases when the crossover phenomenon occurs as well, the voltage falls below the lower limit value. Here, in the former (when fuel is insufficient), it is necessary to supply fuel, while in the latter (when crossover phenomenon occurs), it is necessary to stop fuel supply. However, since focus is placed merely on the voltage in the fuel supply control of the past, there has been a problem that the difference between the former and the latter is not able to be differentiated.

In such a DMFC, as a method of supplying methanol to the fuel electrode, a liquid supply type fuel cell (a liquid fuel (methanol aqueous solution) is directly supplied to the fuel electrode) and a vaporization supply type fuel cell (a vaporized liquid fuel is supplied to the fuel electrode) are proposed. Of the foregoing, in the vaporization supply type fuel cell, fuel supply control according to the concentration of fuel such as in the liquid supply type fuel cell is not able to be performed, and the fuel supply control is performed according to a fuel supply cycle (such as an operation timing of a fuel supply pump, or an opening/closing timing of a shutter). Thereby, in the vaporization supply type DMFC in particular, it is desired that a stable power generation operation independent of the external environment be actualized by inhibiting excess and shortage in the fuel supply amount.

Meanwhile, since a detailed control method using a DC/DC converter is not described in the foregoing Patent Document 2, it is desired that a more efficient control method be actualized.

Further, in the foregoing DMFC, as a method of supplying methanol to the fuel electrode, a liquid supply type fuel cell (a liquid fuel (methanol aqueous solution) is directly supplied to the fuel electrode) and a vaporization supply type fuel cell (a vaporized liquid fuel is supplied to the fuel electrode) are proposed. Of the foregoing, in the vaporization supply type fuel cell, fuel supply control according to the concentration of fuel such as in the liquid supply type fuel cell is not able to be performed, and intermittent fuel supply control is performed according to the fuel supply cycle. Thereby, in the vaporization supply type DMFC in particular, the power generation voltage and the power generation current are difficult to control due to the intermittent fuel supply control, and it is desired that a stable power generation operation be actualized.

A first embodiment of a fuel cell system includes: a power generation section for performing power generation by being supplied a fuel and oxidant gas; a fuel supply section for supplying a liquid fuel to the power generation section side and in which a supply amount of the liquid fuel is able to be adjusted; a fuel vaporization section for supplying a gas fuel to the power generation section by vaporizing the liquid fuel supplied from the fuel supply section; a temperature detection section for detecting temperature of the power generation section; and a control section for performing control so that the temperature of the power generation section becomes constant by adjusting the supply amount of the liquid fuel from the fuel supply section based on the temperature of the power generation section detected by the temperature detection section.

A first embodiment of a electronic device includes the foregoing first fuel cell system.

In the first fuel cell system and the first electronic device embodiments, the liquid fuel supplied from the fuel supply section is vaporized in the fuel vaporization section, and therefore the gas fuel is supplied to the power generation section. Further, in the power generation section, power generation is performed by the gas fuel and oxidant gas being supplied. In addition, the temperature of the power generation section according to such a power generation is detected by the temperature detection section. Then, the supply amount of the liquid fuel from the fuel supply section is adjusted based on the detected temperature of the power generation section, and therefore control is performed so that the temperature of the power generation section becomes constant. Here, the fuel supply amount and the temperature of the power generation section have a monotonic-increase relationship with each other. Thus, power generation current, or generated power, for example, fuel supply control that prevents a crossover phenomenon and is according to changes in the external environment is facilitated. Further, since feedback control in which the temperature of the power generation section becomes constant is performed, compared to a simple control by turning on (carrying out) and off (stopping) fuel supply, the temperature of the power generation section is stabilized.

A second embodiment of a fuel cell system includes: a power generation section for performing power generation by being supplied a fuel and oxidant gas; a fuel supply section for supplying a liquid fuel to the power generation section side and in which a supply amount of the liquid fuel is able to be adjusted; a fuel vaporization section for supplying a gas fuel to the power generation section by vaporizing the liquid fuel supplied from the fuel supply section; a boost circuit for raising a power generation voltage level supplied from the power generation section; and a control section for performing control on a load voltage and a load current supplied from the boost circuit to a load by controlling operation of the boost circuit using a given control table.

A second embodiment of a electronic device includes the foregoing second fuel cell system.

In the second fuel cell system and the second electronic device, the liquid fuel supplied from the fuel supply section is vaporized in the fuel vaporization section, and therefore the gas fuel is supplied to the power generation section. Further, in the power generation section, power generation is performed by the gas fuel and oxidant gas being supplied. In addition, the level of the power generation voltage supplied from the power generation section by such a power generation is raised by the boost circuit and supplied to a load as the load voltage. At this time, the load voltage and the load current supplied from the boost circuit to the load is controlled by controlling the operation of the boost circuit using a given control table.

According to the fuel cell system or the first electronic device, the supply amount of the liquid fuel from the fuel supply section is adjusted based on the detected temperature of the power generation section, and therefore control in which the temperature of the power generation section becomes constant is performed. Thus, fuel supply control that prevents the crossover phenomenon and is according to changes in the external environment is facilitated and, in addition, the temperature of the power generation section is stabilized. In result, power generation is able to be more stably performed regardless of the external environment.

According to the second fuel cell system or the second electronic device, the level of the power generation voltage supplied from the power generation section is raised by the boost circuit, and operation of the boost circuit is controlled using a given control table, and therefore control is performed on the load voltage and the load current supplied from the boost circuit to the load. Thus, even in a case where intermittent fuel supply is performed in a vaporization supply type fuel cell, efficient control of the load voltage and the load current is actualized. In result, power generation in the vaporization supply type fuel cell is able to be more stably performed than in the past.

Additional features and advantages are described herein, and will be apparent from, the following Detailed Description and the figures.

BRIEF DESCRIPTION OF THE FIGURES

FIG. 20 is a characteristics diagram illustrating an example of power generation characteristics by the fuel supply control according to a comparative example 4.

FIG. 21 is a characteristics diagram illustrating an example of power generation characteristics by the fuel supply control according to the second embodiment.

DETAILED DESCRIPTION

Embodiments will be hereinafter described in detail with reference to the drawings.

First Embodiment

Figure 1:
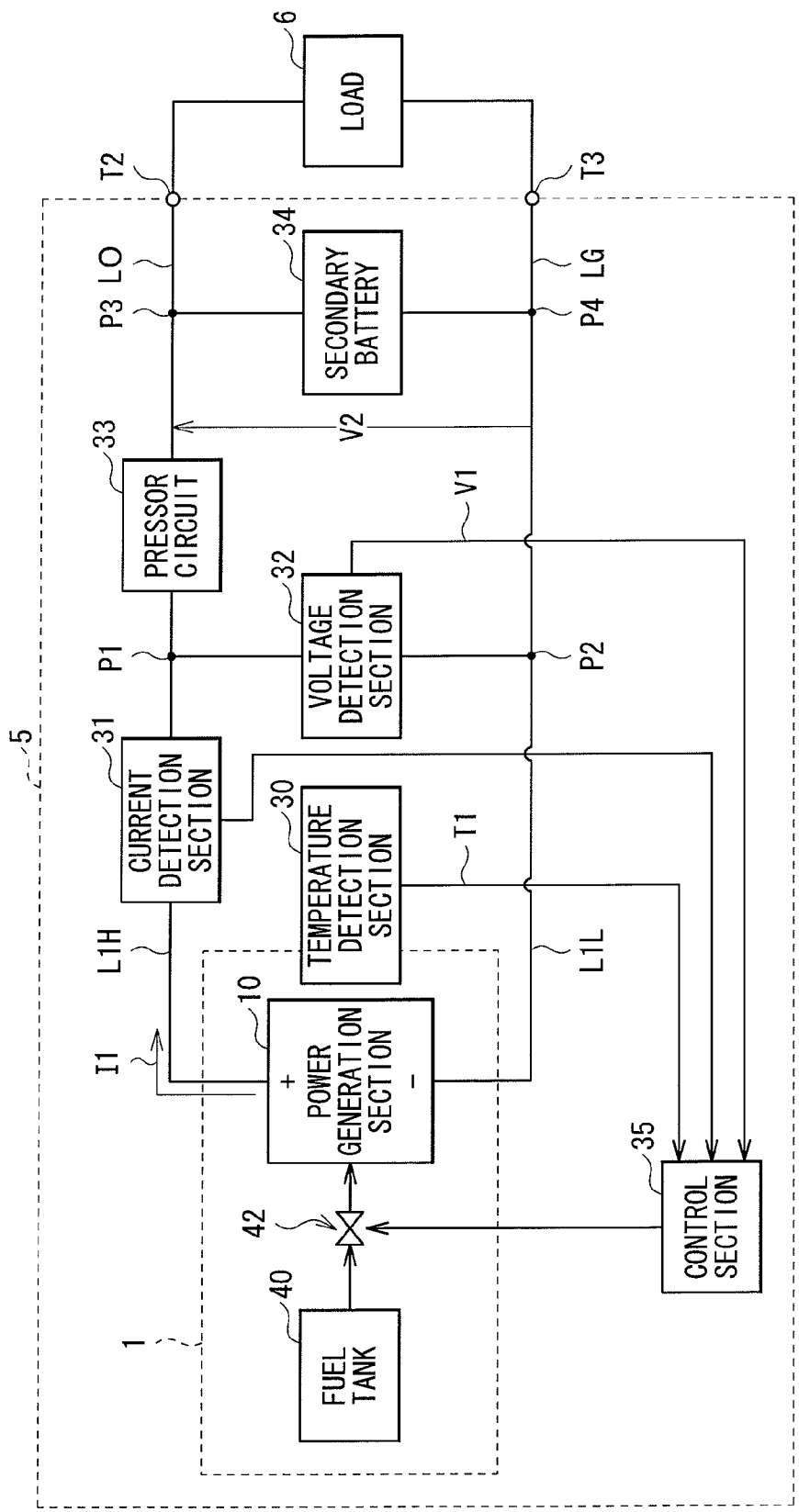
FIG. 1 is a block diagram illustrating a whole structure of a fuel cell system according to a first embodiment.

FIG. 1 illustrates a whole structure of a fuel cell system (fuel cell system 5) according to a first embodiment. The fuel cell system 5 supplies electric power for driving a load 6 through output terminals T2 and T3. The fuel cell system 5 is composed of a fuel cell 1, a temperature detection section 30, a current detection section 31, a voltage detection section 32, a boost circuit 33, a secondary battery 34, and a control section 35.

The fuel cell 1 includes a power generation section 10, a fuel tank 40, and a fuel pump 42. For the detailed structure of the fuel cell 1, a description will be given later.

The power generation section 10 is a direct methanol power generation section for performing power generation by reaction between methanol and oxidant gas (for example, oxygen). The power generation section 10 includes a plurality of unit cells having a cathode (oxygen electrode) and an anode (fuel electrode). For the detailed structure of the power generation section 10, a description will be given later.

The fuel tank 40 stores a liquid fuel necessary for power generation (for example, methanol or methanol aqueous solution). For the detailed structure of the fuel tank 40, a description will be given later.

The fuel pump 42 is a pump for pumping up the liquid fuel contained in the fuel tank 40 and supplying (transporting) the liquid fuel to the power generation section 10 side. The fuel pump 42 is able to adjust fuel supply amount of the fuel. Further, such operation (supply operation of the liquid fuel) of the fuel supply pump 42 is controlled by the after-mentioned control section 35. For the detailed structure of the fuel pump 42, a description will be given later.

The temperature detection section 30 detects temperature (specifically, the temperature surrounding or near the power generation section 10) T1 of the power generation section 10 and is, for example, composed of a thermistor.

The current detection section 31 is arranged between the cathode side of the power generation section 10 and a connection point P1 on a connection line L1H and is intended to detect a power generation current I1 of the power generation section 10. The current detection section 31 includes, for example, a resistor. The current detection section 31 may be arranged on a connection line L1L (between the anode side of the power generation section 10 and a connection point P2).

The voltage detection section 32 is arranged between the connection point P1 on the connection line L1H and the connection point P2 on the connection line L1L. The voltage detection section 32 is intended to detect a power generation voltage V1 of the power generation section 10. The voltage detection section 32 includes, for example, a resistor.

The boost circuit 33 is arranged between the connection point P1 on the connection line L1H and a connection point P3 on an output line LO. The boost circuit 33 is a voltage converter that raises the level of the power generation voltage V1 (DC voltage) of the power generation section 10 and generates a DC voltage V2. The boost circuit 33 is composed of, for example, a DC/DC converter.

The secondary battery 34 is arranged between the connection point P3 on the output line LO and a connection point P4 on a ground line LG. The secondary battery 34 is intended to perform electric storage based on the DC voltage V2 generated by the boost circuit 33. The secondary battery 34 is composed of a lithium ion secondary battery or the like.

The control section 35 is intended to adjust supply amount of the liquid fuel from the fuel pump 42 based on the temperature (detected temperature) T1 of the power generation section detected by the temperature detection section 30, the power generation current (detected current) I1 detected by the current detection section 31 and the power generation voltage (detected voltage) V1 detected by the voltage detection section 32. Specifically, in this embodiment in particular, the control section 35 is intended to perform control so that the temperature of the power generation section 10 becomes constant (almost constant, within a given range) by the supply amount of the liquid fuel from the fuel pump 42 being adjusted based on the detected temperature T1 detected by the temperature detection section 30. The control section 35 is composed of, for example, a micro computer. For the detailed structure and detailed operation of the control section 35, a description will be given later.

Figure 2:
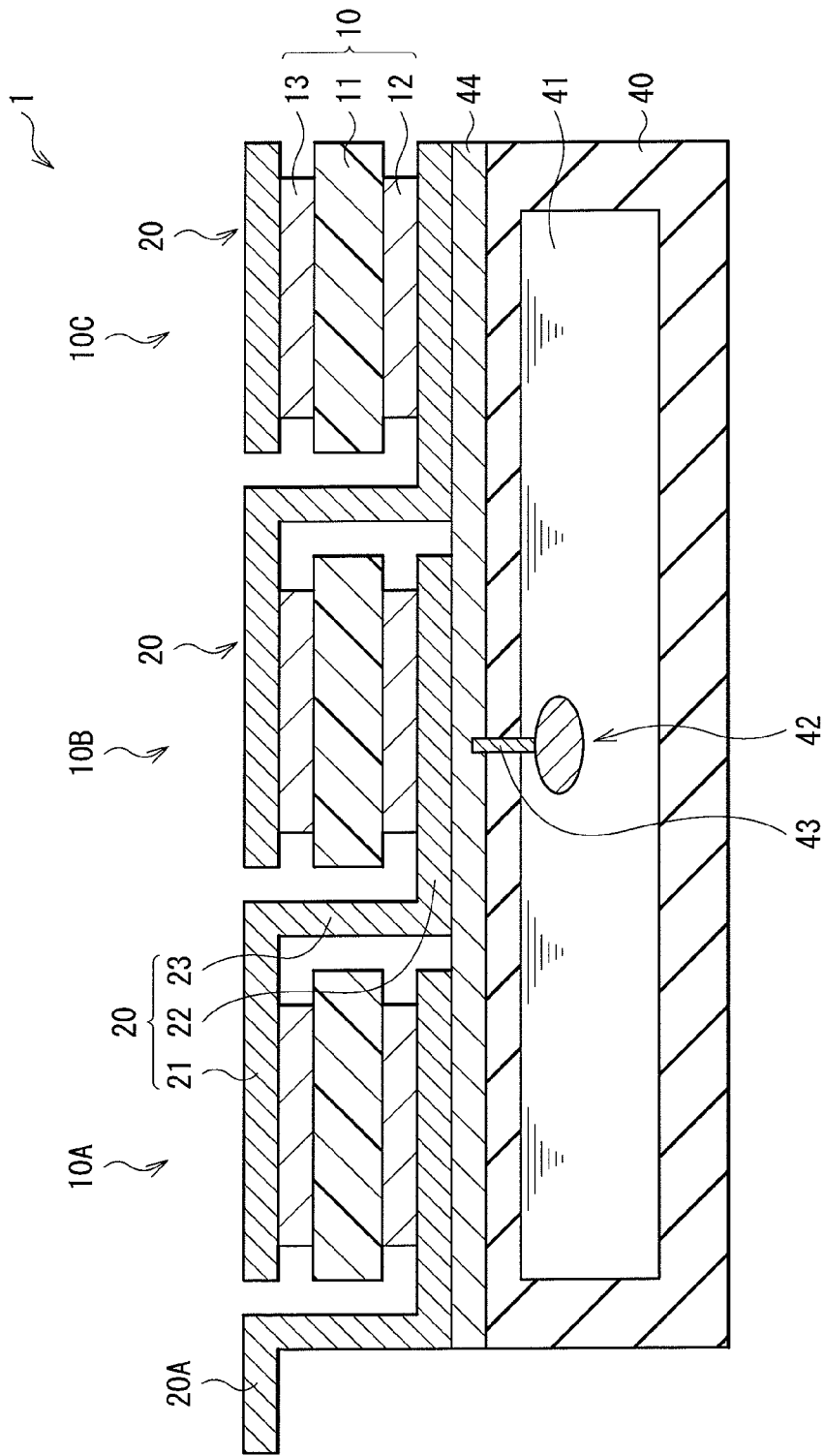
FIG. 2 is a cross sectional view illustrating a structural example of the power generation section illustrated in FIG. 1.
Figure 3:
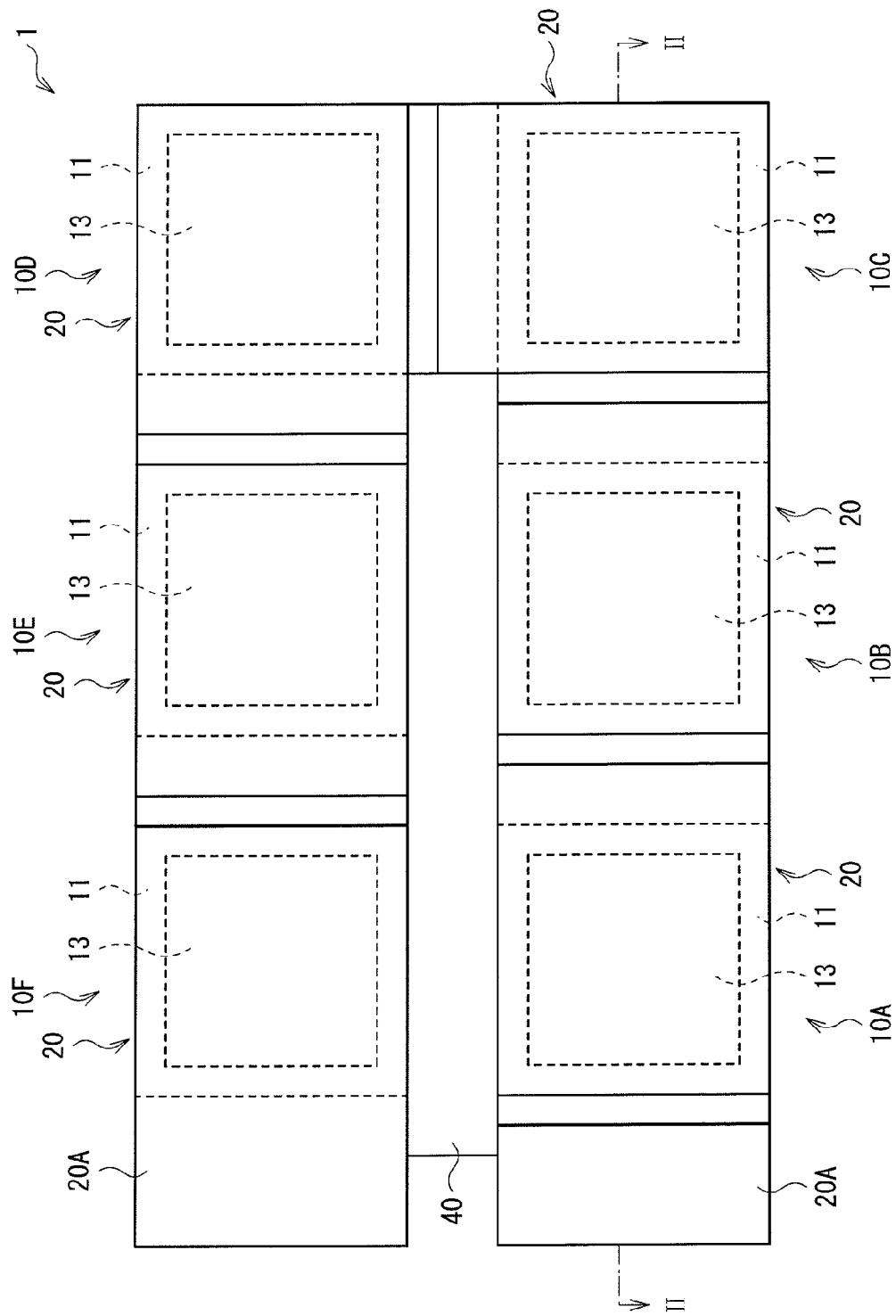
FIG. 3 is a plan view illustrating a structural example of the power generation section illustrated in FIG. 1.
Figure 4:
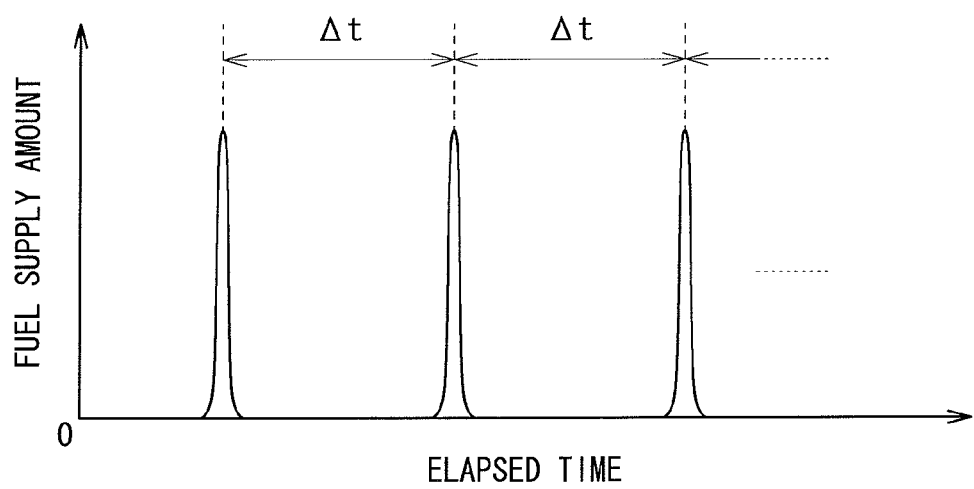
FIG. 4 is a characteristics diagram for explaining summary of a vaporized fuel supply method.

Next, a description will be given of a detailed structure of the fuel cell 1 with reference to FIG. 2 to FIG. 4. FIG. 2 and FIG. 3 illustrate a structural example of unit cells 10A to 10F in the power generation section 10 in the fuel cell 1. FIG. 2 corresponds to a cross sectional structure taken along line II-II of FIG. 3. The unit cells 10A to 10F are arranged, for example, in a matrix of three by two in the in-plane direction, and have a planar laminated structure in which each thereof is electrically connected to each other in series by a plurality of connection members 20. A terminal 20A as an extension section of the connection members 20 is attached to the unit cells 10C and 10F. Further, below the unit cells 10A to 10F, the fuel tank 40, the fuel pump 42, a nozzle 43, and a fuel vaporization section 44 are provided.

The unit cells 10A to 10F each have a fuel electrode (anode, anode electrode) 12 and an oxygen electrode 13 (cathode, cathode electrode) that are oppositely arranged with an electrolyte film 11 in between.

The electrolyte film 11 is made of, for example, a proton conductive material having a sulfonate group ($-SO_3H$). Examples of proton conductive materials include a polyperfluoroalkyl sulfonic acid proton conductive material (for example, "Nafion (registered trademark)," Du Pont make), a hydrocarbon system proton conductive material such as polyimide sulfone acid, and a fullerene system proton conducive material.

The fuel electrode 12 and the oxygen electrode 13 have, for example, a structure in which a catalyst layer containing a catalyst such as platinum (Pt) and ruthenium (Ru) is formed on a current collector made of, for example, carbon paper. The catalyst layer is, for example, a layer in which a supporting body such as carbon black supporting a catalyst is dispersed in a polyperfluoroalkyl sulfonic acid proton conductive material or the like. An air supply pump (not illustrated) may be connected to the oxygen electrode 13. Otherwise, the oxygen electrode 13 may communicate with outside through an aperture (not illustrated) provided in the connection member 20, and air, that is, oxygen may be supplied therein by natural ventilation.

The connection member 20 has a bend section 23 between two flat sections 21 and 22. The flat section 21 is contacted with the fuel electrode 12 of one unit cell (for example, 10A), and the flat section 22 is contacted with the oxygen electrode 13 of an adjacent unit cell (for example, 10B), and thereby the adjacent two unit cells (for example, 10A and 10B) are electrically connected in series. Further, the connection member 20 has a function as a current collector to collect electricity generated in the respective unit cells 10A to 10F. Such a connection member 20 has, for example, a thickness of 150 μm, is composed of copper (Cu), nickel (Ni), titanium (Ti), or stainless steel (SUS), and may be plated with gold (Au), platinum (Pt) or the like. Further, the connection member 20 has an aperture (not illustrated) for respectively supplying a fuel and air to the fuel electrode 12 and the oxygen electrode 13. The connection member 20 is made of mesh such as an expanded metal, a punching metal or the like. The bend section 23 may be previously bent according to the thickness of the unit cells 10A to 10F. Otherwise, in the case where the connection member 20 is made of a material having flexibility such as mesh having a thickness of 200 μm or less, the bend section 23 may be formed by being bent in a manufacturing step. Such a connection member 20 is joined with the unit cells 10A to 10F by, for example, screwing a sealing material (not illustrated) such as PPS (polyphenylene sulfide) and silicon rubber provided around the electrolyte film 11 into the connection member 20.

The fuel tank 40 is, for example, composed of a container with a cubic volume changeable without intrusion of air bubbles or the like therein even if the liquid fuel 41 is increased or decreased (for example, a plastic bag), and a rectangular solid case (structure) to cover the container. The fuel tank 40 is provided with the fuel pump 42 for suctioning the liquid fuel 41 in the fuel tank 40 and ejecting the suctioned liquid fuel 41 from the nozzle 43 in a position above approximately center of the fuel tank 40.

The fuel pump 42 includes, for example, a piezoelectric body (not illustrated), a piezoelectric body support resin section (not illustrated) for supporting the piezoelectric body, and a flow path (not illustrated) as a pipe to connect the fuel tank 40 with the nozzle 43. For example, as illustrated in FIG. 4, the fuel pump 42 is able to adjust the supply amount of fuel according to a change in the fuel supply amount per one operation or a change in the fuel supply cycle Δt. The fuel pump 42 corresponds to a specific example of a "fuel supply section" of the present embodiment.

The fuel vaporization section 44 is intended to vaporize the liquid fuel supplied from the fuel pump 42 and thereby to supply the vaporized fuel to the power generation section 10 (respective unit cells 10A to 10F). The fuel vaporization section 44 is structured by providing a diffusion section (not illustrated) for promoting diffusion of the fuel on a plate (not illustrated) made of, for example, a metal or an alloy containing stainless steel, aluminum, or the like, or a resin material with high rigidity, such as cycloolefin copolymer (COC). As the diffusion section, an inorganic porous material such as alumina, silica, and titanium oxide or a resin porous material is able to be used.

The nozzle 43 is an ejection hole of the fuel transported through the flow path (not illustrated) of the fuel pump 42, and ejects the fuel toward the diffusion section provided on the surface of the fuel vaporization section 44. Thereby, the fuel transported to the fuel vaporization section 44 is diffused and vaporized, and is supplied to the power generation section 10 (respective unit cells 10A to 10F). The nozzle 43 has a bore with a diameter from 0.1 mm to 0.5 mm both inclusive, for example.

Figure 5:
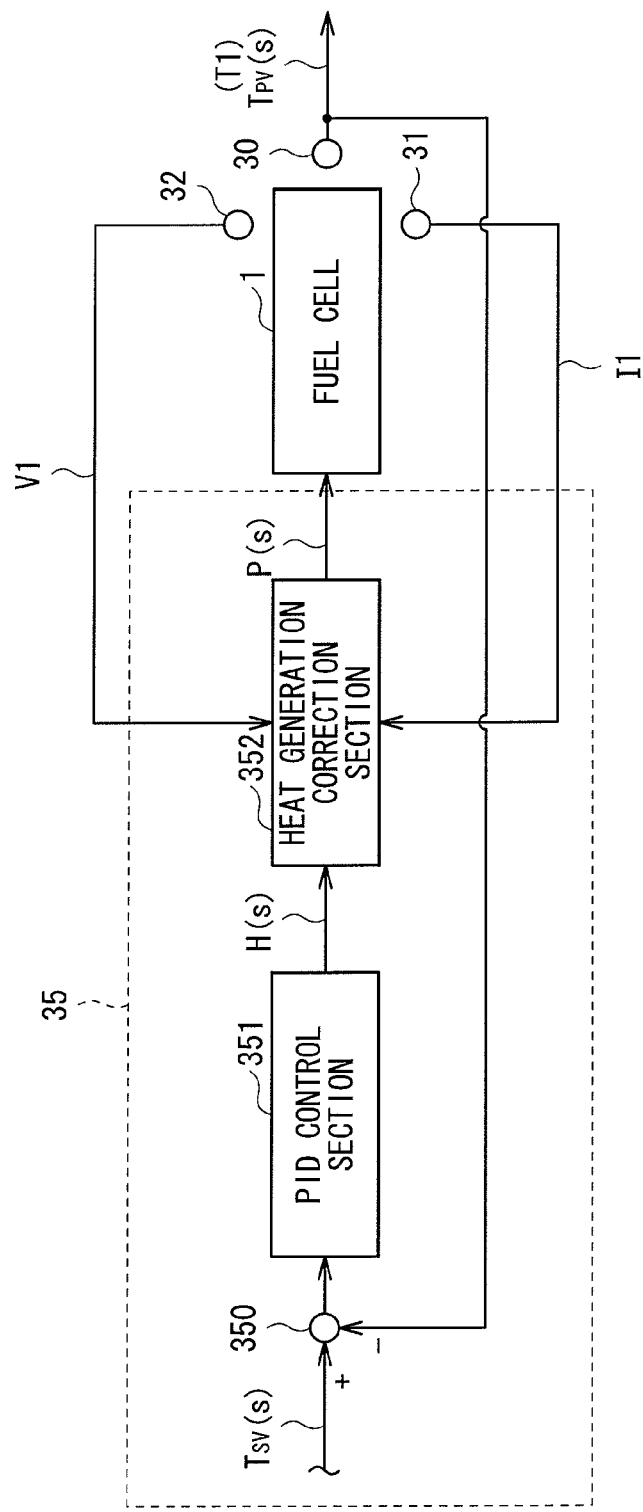
FIG. 5 is a block diagram for explaining a detailed structure of the control section illustrated in FIG. 1.

Next, a detailed structure of the control section 35 will be described with reference to FIG. 5. FIG. 5 illustrates a detailed block structure of the control section 35.

The control section 35 is composed of a subtraction section (difference calculation section) 350, a PID control section 351, and a heat generation correction section 352.

The subtraction section 350 is intended to determine a difference value (=Tsv(s)−Tpv(s)) between a target temperature (setting temperature) Tsv(s) previously set in the control section 35 or inputted from outside, and a temperature (detected temperature) T1 (Tpv(s)) of the power generation section 10 detected by the temperature detection section 30, and output the difference value to the PID control section 351.

The PID control section 351 is intended to calculate the supply amount of the liquid fuel (desired heat generation amount H(s)) by proportioning with a time integral and a time derivative of the difference value between the target temperature Tsv(s) and detected temperature Tpv(s) determined in the subtraction section 350, and output the desired heat generation amount H(s) to the heat generation correction section 352.

Specifically, the PID control section 351 calculates the desired heat generation amount H(s) using the following Equation (1) and Equation (2).

$$H(s) = K_P \Delta T(s) + T_I \int \Delta T(s) ds + T_D \{d\Delta T(s)/ds\} \quad (1)$$

$$\Delta T(s) = Tsv(s) - Tpv(s) \quad (2)$$

In the equations, H(s) represents desired heat generation amount; $K_P$, $T_I$, and $T_D$ represent PID constants; Tsv(s) represents target temperature; $\Delta T(s)$ represents difference in temperature; and s represents time.

The heat generation correction section 352 is intended to calculate energy conversion efficiency in the power generation section 10 based on the power generation voltage (detected voltage) V1 detected by the voltage detection section 32 and the power generation current (detected current) I1 detected by the current detection section 31, and calculate a fuel supply amount P(s) (corrects the supply amount of the liquid fuel calculated in the PID control section 351) using the calculated energy conversion efficiency. Information on the fuel supply amount P(s) is output to the fuel pump 42 in the fuel cell 1. In result, although details will be described hereafter, the temperature of the power generation section 10 becomes constant.

Specifically, the heat generation correction section 352 calculates the fuel supply amount P(s) using the following Equation (3) and Equation (4). In this embodiment, energy conversion efficiency η in the power generation section 10 is calculated also taking into consideration the power generation current I1 of the power generation section 10 in addition to the power generation voltage V1 of the power generation section 10. However, the energy conversion efficiency η in the power generation section 10 may be approximately calculated ($\eta \approx V_O/V_T$) by performing an approximation that usage rate E of fuel is almost 1. This is because in actual control, control operation is barely affected, even if such an approximate calculation is performed.

$$P(s)(=P_{PID}(s)) = H(s) \times (1-\eta) \quad (3)$$

$$\eta = \{(V_O I_O)/(V_T I_T)\} = (V_O/V_T) \times E \quad (4)$$

$I_T$ represents a theoretical current value estimated from the fuel supply amount.

The fuel cell system 5 of this embodiment is able to be manufactured, for example, as follows.

First, the electrolyte film 11 made of the foregoing material is sandwiched between the fuel electrode 12 and the oxygen electrode 13 made of the foregoing material. The resultant is joined by thermal compression bond. Thereby, the fuel electrode 12 and the oxygen electrode 13 are joined with the electrolyte film 11 to form the unit cells 10A to 10F.

Figure 6:
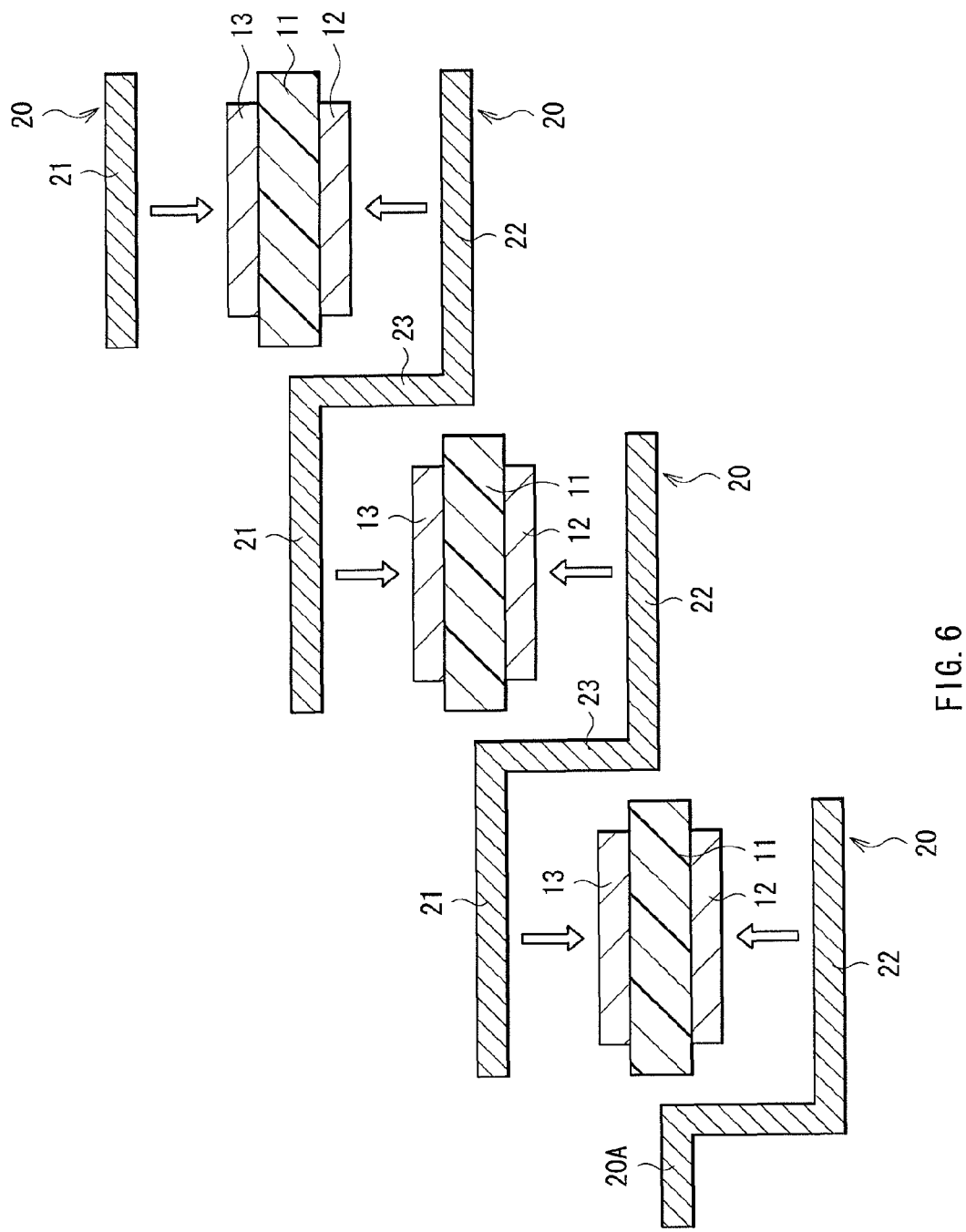
FIG. 6 is a cross sectional view for explaining a method of manufacturing the power generation section illustrated in FIG. 1.
Figure 7:
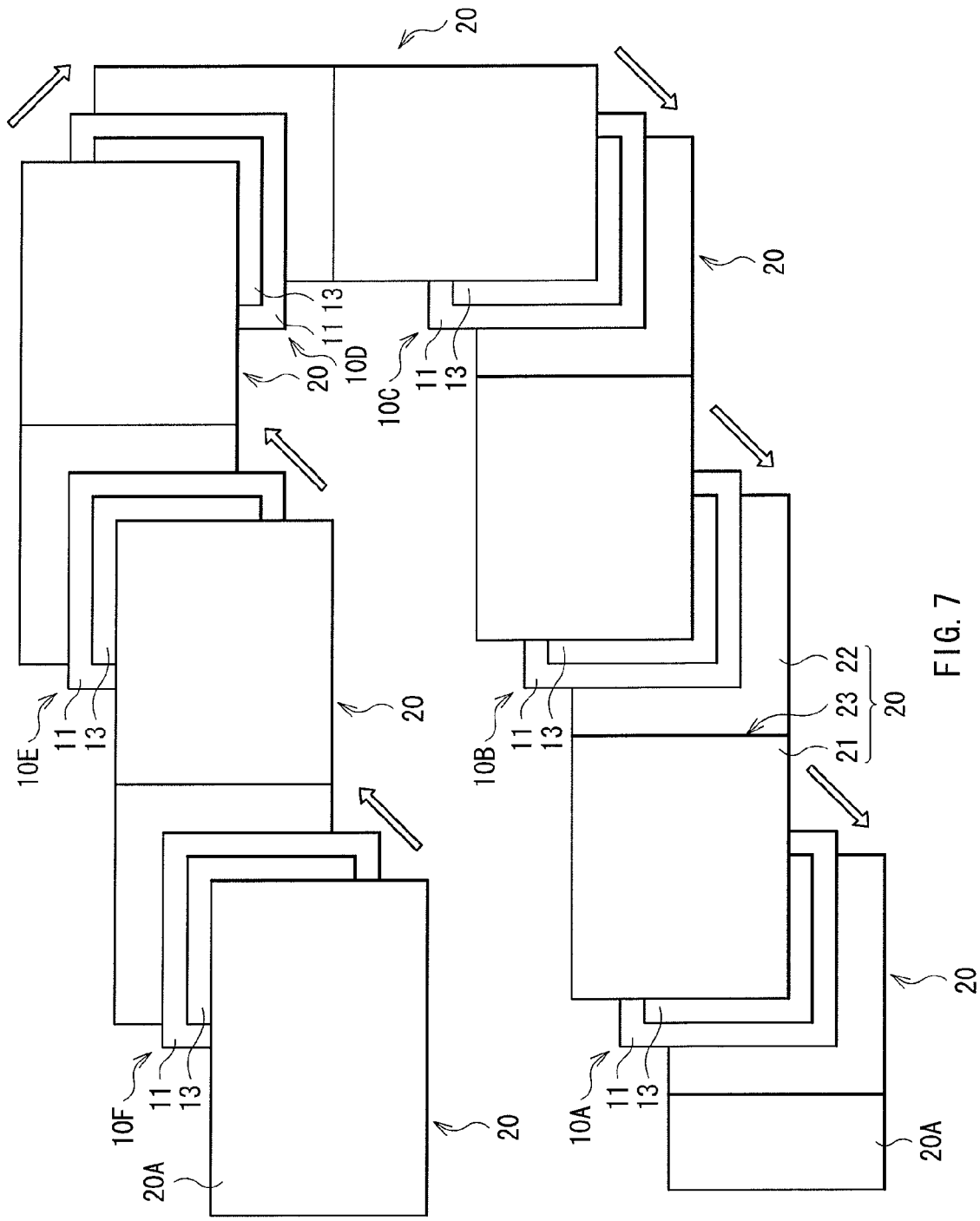
FIG. 7 is a plan view for explaining a method of manufacturing the power generation section illustrated in FIG. 1.

Next, the connection member 20 made of the foregoing material is prepared. As illustrated in FIG. 6 and FIG. 7, the six unit cells 10A to 10F are arranged in a matrix of three by two, and are electrically connected to each other in series by the connection member 20. The sealing material (not illustrated) made of the foregoing material is provided around the electrolyte film 11, and the sealing material is screwed and fixed on the bend section 23 of the connection member 20.

After that, the fuel tank 40 that contains the liquid fuel 41 and is provided with the fuel pump 42, the nozzle 43 and the like is arranged on the fuel electrode 12 side of the linked unit cells 10A to 10F, and therefore the fuel cell 1 is formed. The foregoing temperature detection section 30, the current detection section 31, the voltage detection section 32, the boost circuit 33, the secondary battery 34, and the control section 35 are electrically connected in parallel to the fuel cell 1 respectively as illustrated in FIG. 1. Accordingly, the fuel cell system 5 illustrated in FIG. 1 to FIG. 3 is completed.

Next, a description will be given in detail of action and effect of the fuel cell system 5 of this embodiment, while comparing the fuel cell system 5 with comparative examples.

In the fuel cell system 5, the liquid fuel 41 contained in the fuel tank 40 is pumped up by the fuel pump 42, and therefore the liquid fuel 41 passes through the flow path (not illustrated) and reaches the fuel vaporization section 44. In the fuel vaporization section 44, in the case where the liquid fuel is ejected by the nozzle 43, the fuel is diffused over a wide range by the diffusion section (not illustrated) provided on the surface thereof. Thereby, the liquid fuel 41 is naturally vaporized, and the vaporized fuel is supplied to the power generation section 10 (specifically, the fuel electrodes 12 of the respective unit cells 10A to 10F).

Meanwhile, air (oxygen) is supplied to the oxygen electrode 13 of the power generation section 10 by natural ventilation or an air supply pump (not illustrated). Then, in the oxygen electrode 13, reaction shown in the following Expression (5) is generated, and hydrogen ions and electrons are generated. The hydrogen ions reach the fuel electrode 12 through the electrolyte film 11. In the fuel electrode 12, reaction shown in the following Expression (6) is generated, and water and carbon dioxide are generated. Thus, as the entire fuel cell 1, reaction shown in the following Expression (7) is generated, and power generation is performed.

$$CH_3OH + H_2O \rightarrow CH_2 6H^+ + 6e^- \quad (5)$$

$$6H^+ + (3/2)O_2 + 6e^- \rightarrow 3H_2O \quad (6)$$

$$CH_3OH + (3/2)O_2 \rightarrow CO_2 + 2H_2O \quad (7)$$

Thereby, part of chemical energy of the liquid fuel 41, that is, methanol is converted to electric energy, which is collected by the connection member 20 and is extracted as a current (power generation current I1) from the power generation section 10. The level of the power generation voltage (DC voltage) V1 based on the power generation current I1 is raised (voltage conversion) by the boost circuit 33 and becomes the DC voltage V2. The DC voltage V2 is supplied to the secondary battery 34 or a load (for example, an electronic device body). In the case where the DC voltage V2 is supplied to the secondary battery 34, the secondary battery 34 is charged based on the voltage. Meanwhile, in the case where the DC voltage V2 is supplied to the load 6 through the output terminals T2 and T3, the load 6 is driven, and given operation is made. At this time, in the fuel pump 42, the supply amount of fuel is adjusted according to a change in the fuel supply amount per one operation or a change in the fuel supply cycle $\Delta t$ under the control of the control section 35.

Figure 8:
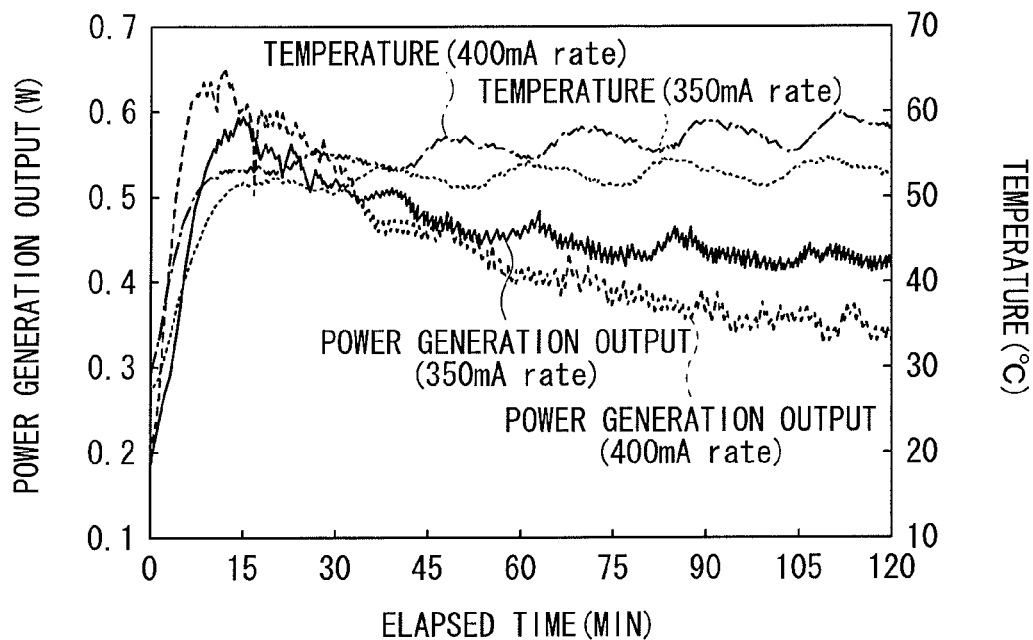
FIG. 8 is a characteristics diagram illustrating an example of power generation characteristics by the fuel supply control according to a comparative example 1.

Here, in a past fuel supply control of a comparative example 1, the foregoing fuel supply cycle $\Delta t$ is constant at all times. In this case, a loop that is "output increases→temperature increases→electrolyte film 11 becomes dry→output decreases→temperature decreases→electrolyte film 11 becomes moist→ . . . " is continuously repeated. Thereby, for example, as illustrated in FIG. 8, power generation output and temperature varies significantly regardless of the fuel supply being at a constant interval.

Figure 9:
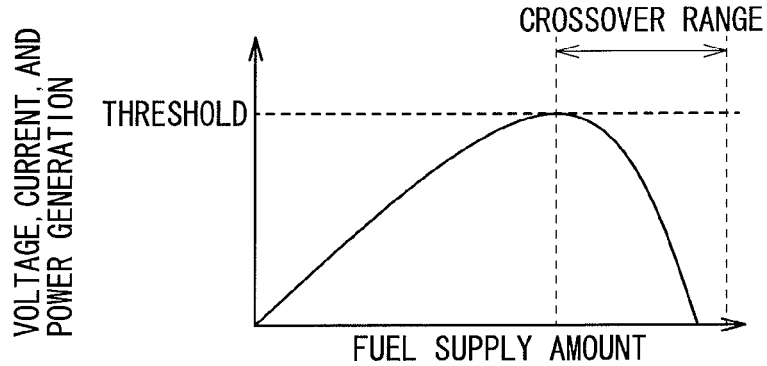
FIG. 9 is a schematic characteristics diagram for explaining power generation characteristics by the fuel supply control according to a comparative example 2.

Further, in a past fuel supply control of a comparative example 2, two threshold values (an upper limit value and a lower limit value) are set for the power generation voltage during constant current power generation control and for the power generation current during constant voltage power generation control, and the fuel supply is stopped when the upper limit value is exceeded. Meanwhile, the fuel supply is resumed when the value falls below the lower limit value. However, for example, as illustrated in FIG. 9, the fuel supply amount, the power generation voltage, the power generation current, and the power generation output that is the product of the foregoing do not indicate change that is monotonic with each other, and a mountain-shaped curve is drawn in which the power generation voltage and the like have a maximal value according to increase in the fuel supply amount. Therefore, for example, in the case where the power generation voltage is low, since it is not possible to know whether the maximal value (threshold value) is exceeded at that point, an accurate determination of whether to increase or decrease fuel supply is not able to be made. Specifically, for example, in the case where the crossover phenomenon occurs, the situation is worsened. In other words, for example, while the voltage decreases and falls below the lower limit value when fuel is insufficient during constant current control, since the voltage similarly decreases when the crossover phenomenon occurs as well, the voltage falls below the lower limit value. Here, in the former (when fuel is insufficient), it is necessary to supply fuel, while in the latter (when crossover phenomenon occurs), it is necessary to stop fuel supply. However, since focus is placed merely on voltage in the fuel supply control of the comparative example 2, the difference between the former and the latter is not able to be differentiated.

Meanwhile, in the fuel cell system 5 of this embodiment, as illustrated in FIG. 1 and FIG. 5, the temperature (detected temperature) T1 of the power generation section 10 is detected by the temperature detection section 30, and the supply amount of the liquid fuel by the fuel pump 42 is adjusted by the control section 35 based on the detected temperature T1. Here, unlike the foregoing power generation voltage and the like, the fuel supply amount and the temperature of the power generation section have a monotonic-increase relationship with each other, as illustrated in FIG. 10, for example.

Figure 10:
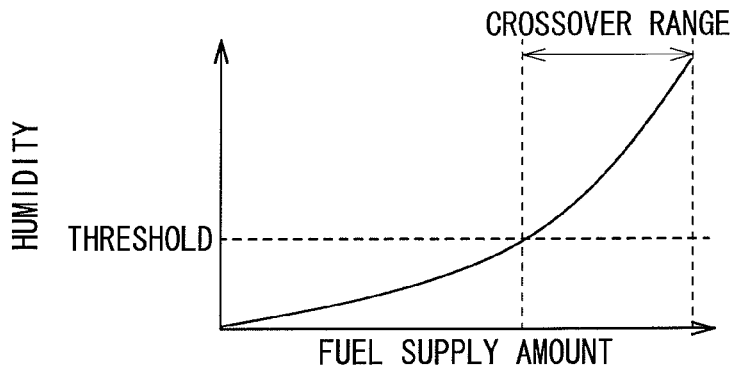
FIG. 10 is a schematic characteristics diagram for explaining summary of power generation characteristics by the fuel supply control according to the first embodiment.

Thereby, compared to the fuel supply control based on the power generation voltage and the like such as in the comparative example 1, for example, fuel supply control that prevents the crossover phenomenon and is according to changes in the external environment is facilitated (for example, threshold values such as those illustrated in FIG. 10 are more easily defined). Specifically, all that is needed is to reduce fuel supply every time when the detected temperature T1 is too high and, on the contrary, increase fuel supply every time when the detected temperature T1 is too low. Since a situation that causes failure is not present according to this principle, highly stable and robust power generation is able to be continued.

Further, to begin with, the fuel cell generates power by chemical reaction. Oxidation reaction of the fuel progresses in the fuel electrode and reductive reaction of the oxidant progresses in the oxygen electrode. Thus, controlling power generation is nothing other than controlling the chemical reaction itself. Here, according to chemical reaction kinetics, parameters determining a chemical reaction rate are frequency factor, activation energy, and temperature. Considering that the two former parameters are almost constants, it is clear that stabilizing the temperature is important for stabilizing the chemical reaction of the fuel cell. Therefore, from such a perspective as well, stable power generation is able to be actualized by stabilizing temperature, which is a basic control parameter for determining the power generation current.

Figure 11:
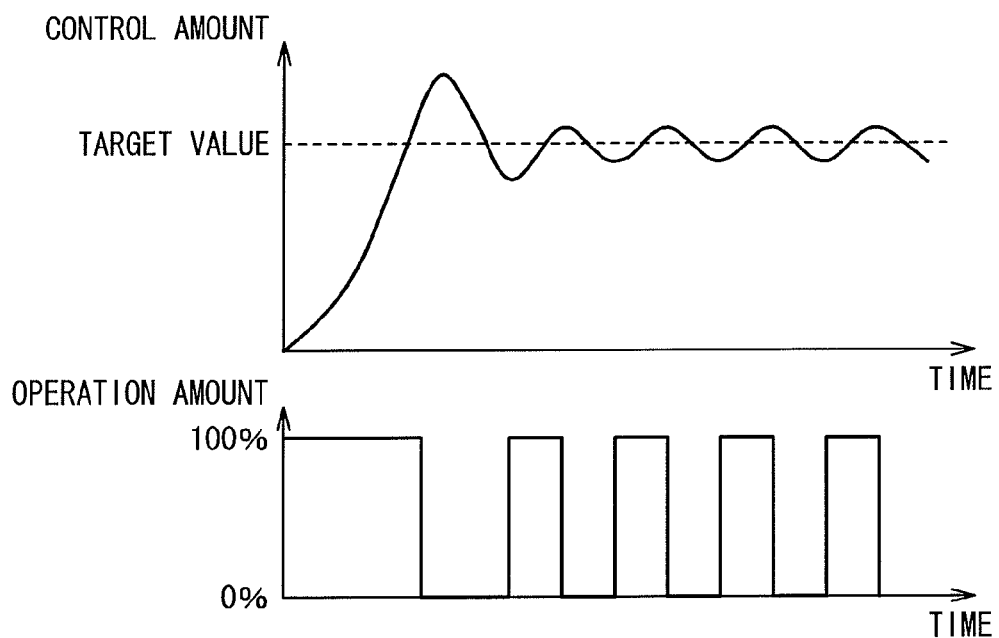
FIG. 11 is a schematic characteristics diagram for explaining power generation characteristics by the fuel supply control according to a comparative example 3.

However, it cannot be said that a simple control in which, when fuel supply is performed based on the detected temperature T1, the fuel supply is stopped when the upper limit temperature is exceeded, while the fuel supply is resumed when the temperature falls below the lower limit temperature, is ideal. In this case, in a similar manner to temperature control by a thermostat using bimetal, for example, as in a comparative example 3 illustrated in FIG. 11(A) and FIG. 11(B), the possibility of the temperature fluctuating significantly is high. In other words, stopping the fuel supply after the upper limit temperature is exceeded is too late, and the temperature T1 of the power generation section 10 further increases. Meanwhile, resuming the fuel supply after the temperature falls below the lower limit temperature is also too late, and the temperature T1 of the power generation section 10 further decreases.

Thus, in the fuel cell system 5 of this embodiment, as illustrated in FIG. 5, feedback control (specifically, PID control) in which the temperature of the power generation section 10 becomes constant is performed by the PID control section 351. The PID control is a classical feedback control method that is able to quickly bring a control amount closer to a target value and stabilize the control amount, and is a control method that is able to smoothly bring the control amount closer to an actual target value.

Figure 12:
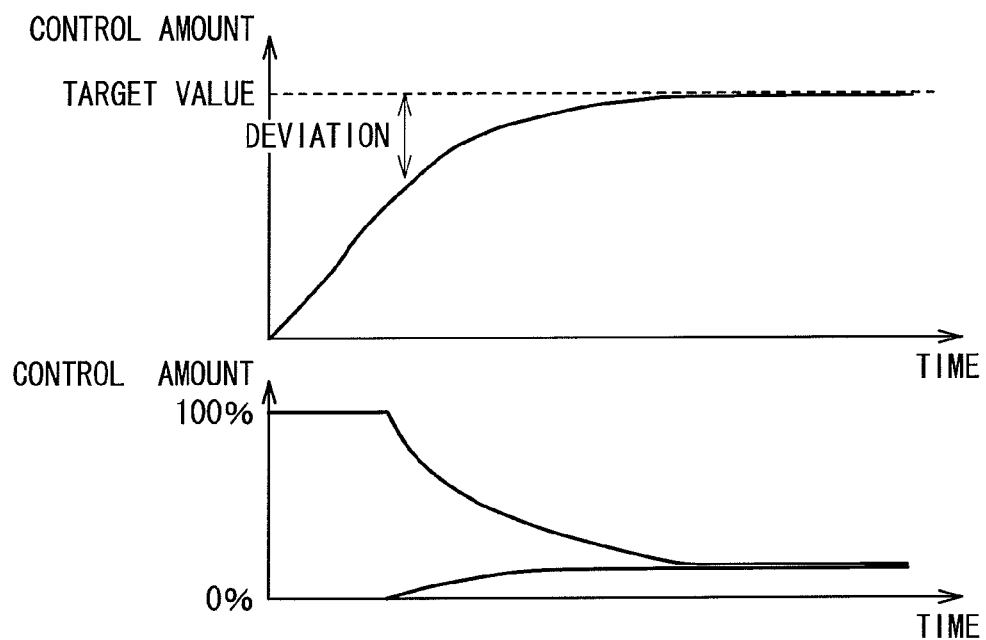
FIG. 12 is a schematic characteristics diagram for explaining the details of power generation characteristics by the fuel supply control according to the first embodiment.
Figure 13:
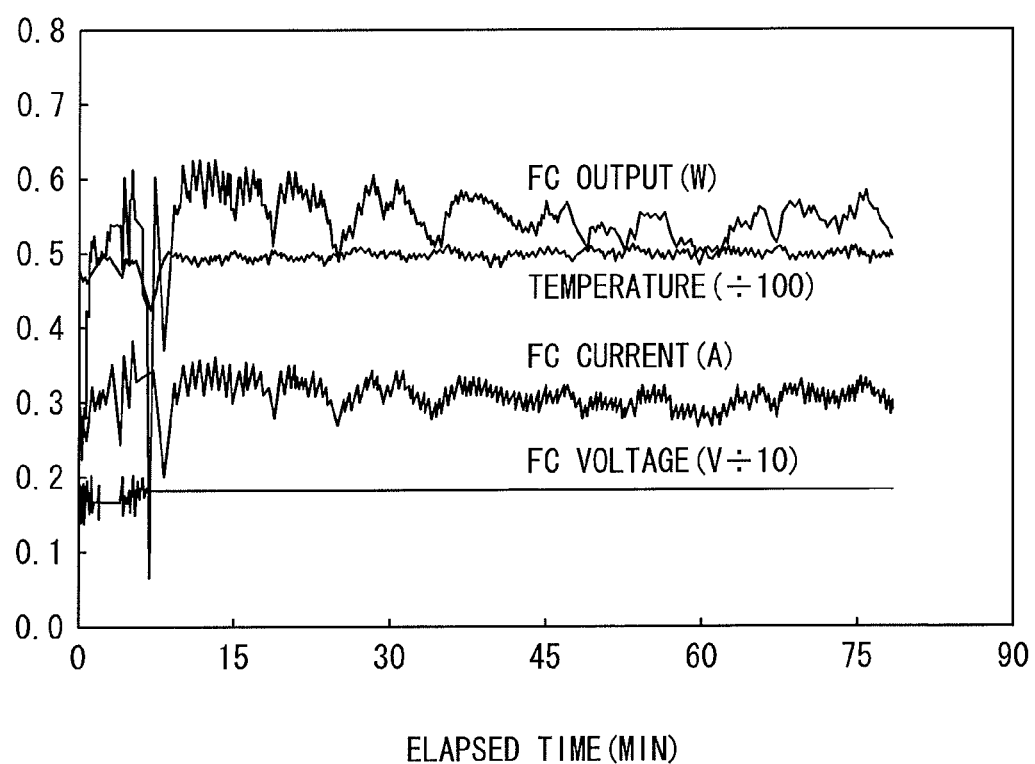
FIG. 13 is a characteristics diagram illustrating an example of power generation characteristics by the fuel supply control according to the first embodiment.
Figure 14:
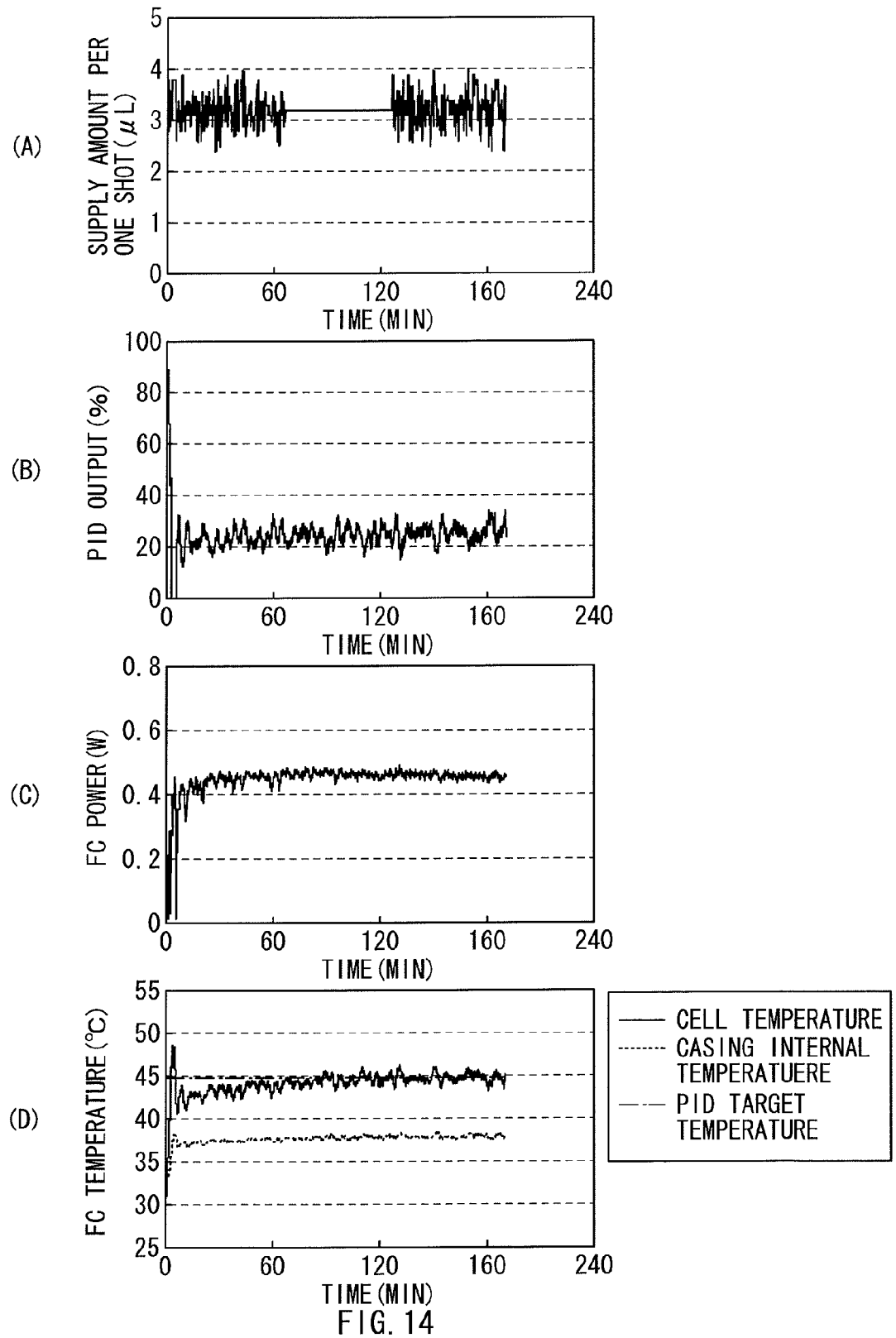
FIG. 14 is a characteristics diagram illustrating another example of power generation characteristics by the fuel supply control according to the first embodiment.
Figure 15:
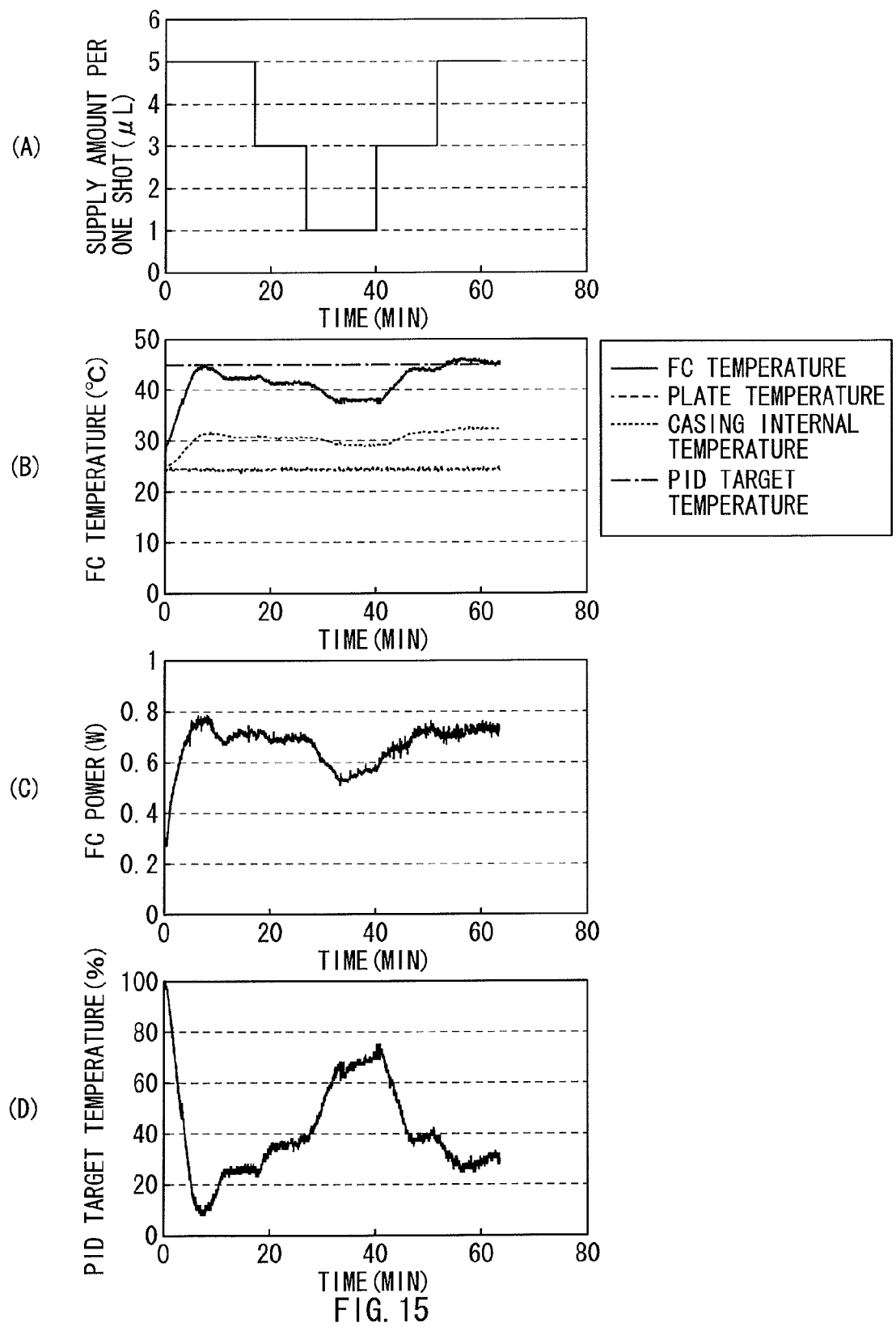
FIG. 15 is a characteristics diagram illustrating another example of power generation characteristics by the fuel supply control according to the first embodiment.
Figure 16:
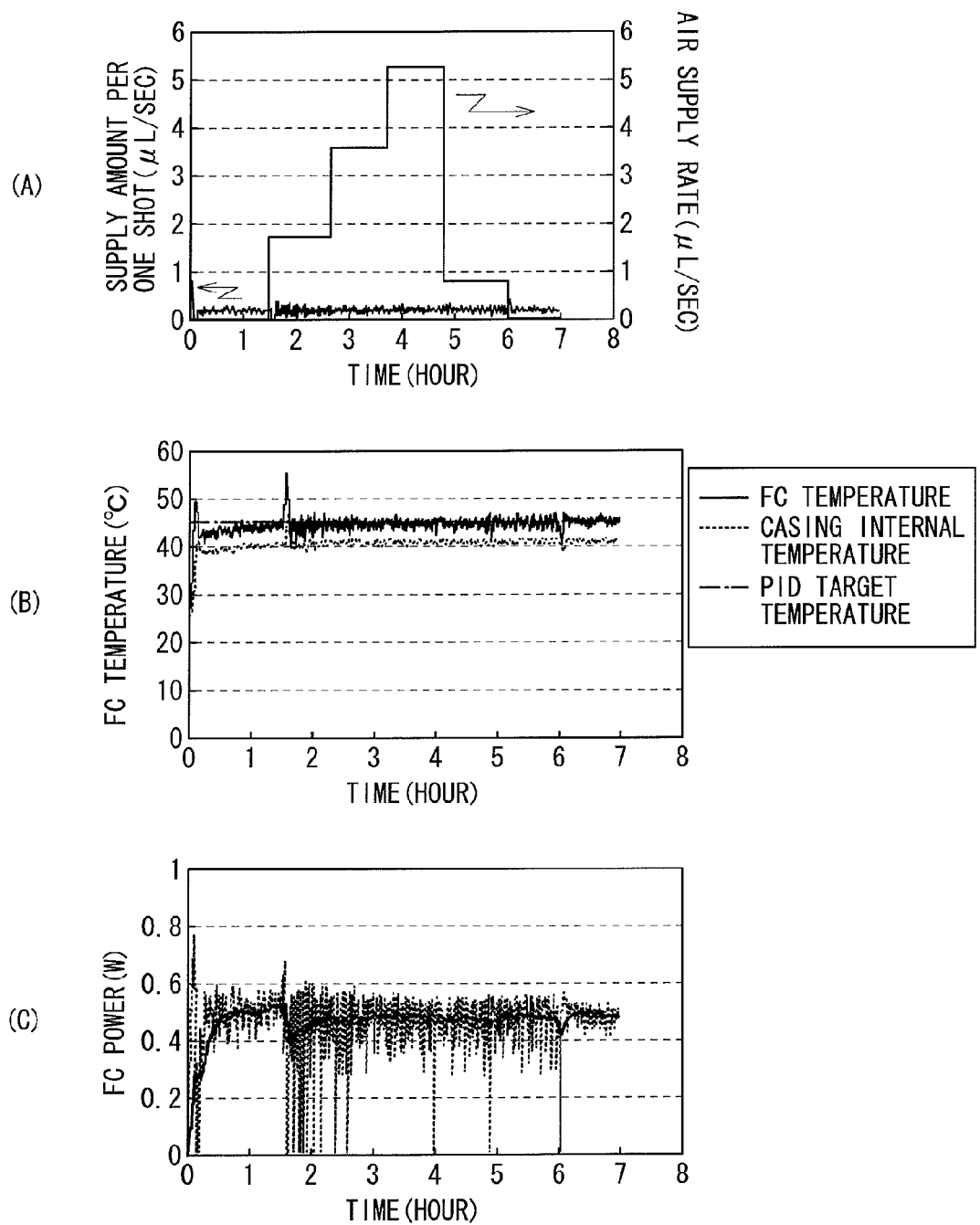
FIG. 16 is a characteristics diagram illustrating another example of power generation characteristics by the fuel supply control according to the first embodiment.

In result, for example, as illustrated in FIG. 12(A) and FIG. 12(B), overshooting and undershooting of the temperature of the power generation section 10 are prevented. Compared to the simple control by turning on (carrying out) and off (stopping) the fuel supply described in the foregoing comparative example 3, the temperature of the power generation section 10 stabilizes. Thereby, for example, as illustrated in FIG. 13, it is clear that the power generation operation is stably performed in the power generation section 10 by the fuel supply control of this embodiment.

In addition, for example, in an example illustrated in FIG. 14(A) to FIG. 14(D), rather than directly supplying the calculated fuel supply amount, a power generation test is performed by adding noise to the calculation result (power generation result when changes are made from noise added→no noise→noise added). According to FIG. 14, it is clear that the power generation output is barely affected even when noise is added, and power generation is stably continued. In a fuel cell system using a fuel pump as a fuel supply means, the injection amount may possibly change as a result of decay with age of the fuel pump and disturbance. However, the results illustrated in FIG. 14 indicate power generation is stably continued even when the injection amount of the fuel pump unexpectedly changes.

Further, for example, an example illustrated in FIG. 15(A) to FIG. 15(D) is a case in which the fuel supply amount is suddenly significantly changed (here, when suddenly reduced). According to FIG. 15, it is clear that, even if the fuel supply amount is suddenly significantly changed, the change is mostly able to be absorbed by PID control.

Further, for example, an example illustrated in FIG. 16(A) to FIG. 16(D) is a case in which air bubbles are mixed in the liquid fuel. According to FIG. 16, it is clear that, even if some air bubbles are mixed in the fuel electrode, the change is mostly able to be absorbed by PID control.

As described above, in this embodiment, control in which the temperature T1 of the power generation section 10 becomes constant is performed by adjusting the supply amount of the liquid fuel from the fuel pump 42 based on the temperature T1 of the power generation section 10 detected by the temperature detection section 30. Thereby, compared to the past, for example, fuel supply control that prevents the crossover phenomenon and is according to changes in the external environment is facilitated and, in addition, the temperature of the power generation section 10 is stabilized. Thus, power generation is able to be more stably performed than in the past, regardless of the external environment (for example, decay with age and disturbances).

Specifically, in the PID control section 351, control in which the temperature of the power generation section 10 becomes constant is performed by proportioning the supply amount of the liquid fuel with the time integral and the time derivative of the difference value between the target temperature Tsv(s) and the detected temperature T1 (Tpv(s)). Thus, the foregoing effect is able to be obtained.

Further, in the heat generation correction section 352, the energy conversion efficiency η in the power generation section 10 is calculated based on the power generation voltage V1 detected by the voltage detection section 32 and the power generation current I1 detected by the current detection section 31, and the supply amount of the liquid fuel is corrected using the calculated energy conversion efficiency η. Thus, fuel supply control taking into consideration the energy conversion efficiency η becomes possible, and power generation that is more stable than that in the past is able to be performed.

Further, even in a vaporization supply type DMFC in which stable power generation operation independent of the external environment is particularly desired, power generation is able to be performed more stably than in the past by inhibiting excess and shortage of the fuel supply amount.

Second Embodiment

Next, a second embodiment will be described. A fuel cell system of this embodiment is the fuel cell system 5 of the first embodiment illustrated in FIG. 1 in which an after-mentioned control section 36, described hereafter, is provided in place of the control section 35. Thus, the same symbols are affixed to the elements similar to those of the foregoing first embodiment, and the description thereof will be omitted as appropriate.

Figure 17:
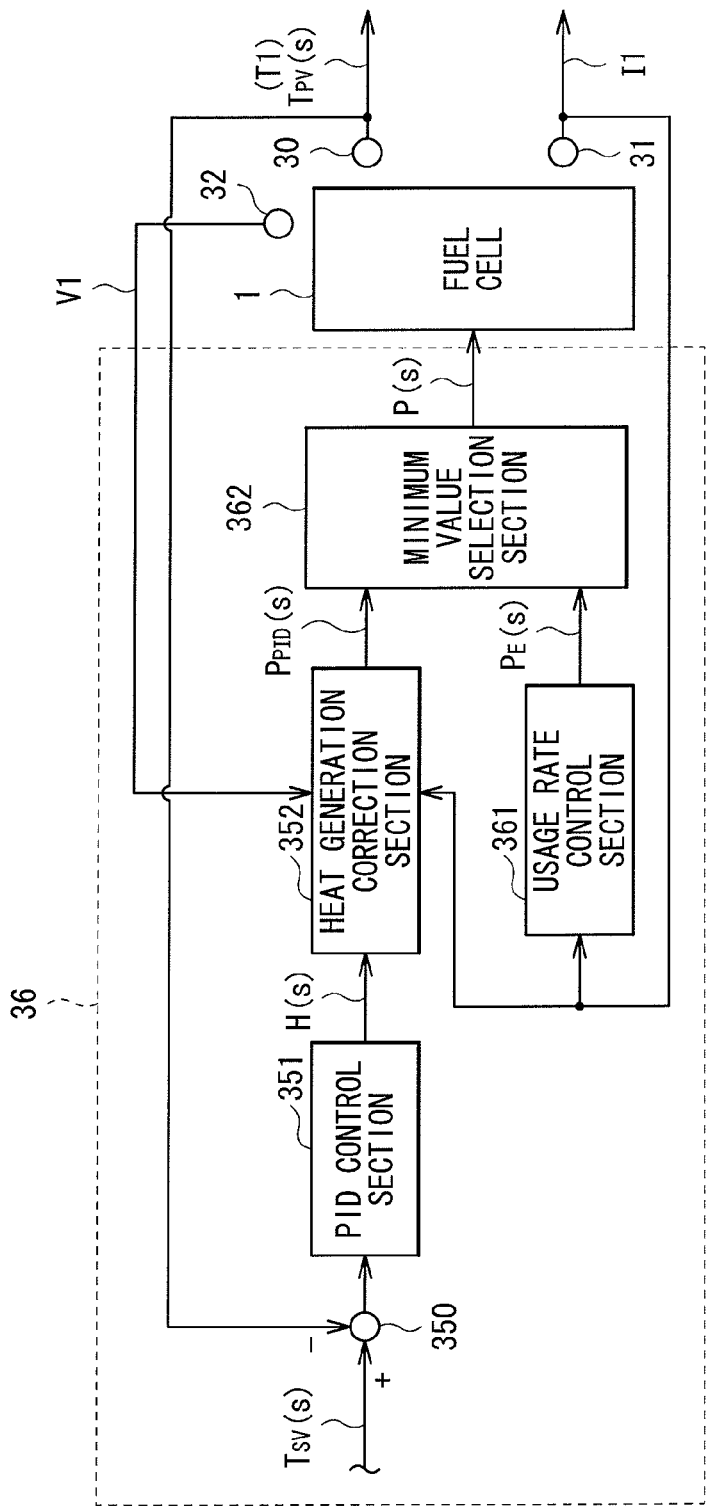
FIG. 17 is a block diagram for explaining a detailed structure of the control section according to a second embodiment.

FIG. 17 illustrates a block structure of the control section 36 of this embodiment. The control section 36 is composed of the subtraction section (difference calculation section) 350, the PID control section 351, the heat generation correction section 352, a usage rate control section 361, and a minimum value selection section 362. In other words, the usage rate control section 361 and the minimum value selection section 362 are further provided in the control section 35 of the first embodiment illustrated in FIG. 5.

The usage rate control section 361 calculates a usage rate E (=actual power generation current value $I_O$/theoretical current value $I_T$ estimated from the fuel supply amount) of fuel in the power generation section 10 based on the power generation current (detected current) I1 detected by the current detection section 31 and calculates a supply amount $P_E(s)$ of the liquid fuel so that the calculated usage rate E of the fuel is maintained (becomes constant). Since an electric charge of $6e^-$ is extracted per one methanol molecule, the usage rate E of fuel refers to a ratio of a measured current (here, the detected current I1) to a theoretical maximum current, calculated based on this relation.

Specifically, the usage rate control section 361 calculates the fuel supply amount $P_E(s)$ using the following Equation (8).

$$P_E(s) = Kcell \times Esv \times Ipv(s) \qquad (8)$$

(Kcell represents a constant of proportion; Esv represents a setting value of the usage rate; and Ipv(s) represents a current power generation current value)

The minimum value selection section 362 determines a final fuel supply amount P(s), taking into consideration the fuel supply amount $P_{PID}(s)$ (first fuel supply amount) calculated based on the temperature T1 of the power generation section 10 in the PID control section 351 and the heat generation correction section 352, and the fuel supply amount $P_E(s)$ (second fuel supply amount) calculated based on the usage rate E of the fuel in the usage rate control section 361, and supplies the final fuel supply amount P(s) to the fuel pump 42 in the fuel cell 1. Specifically, the final fuel supply amount P(s) is determined by selecting one of the fuel supply amount $P_{PID}(s)$ and the fuel supply amount $P_E(s)$. More specifically, the final fuel supply amount P(s) is determined by selecting the smaller supply amount value of the fuel supply amount $P_{PID}(s)$ and the fuel supply amount $P_E(s)$.

Another selection method may be used instead of the selection method in the minimum value selection section 36. For example, the final fuel supply amount P(s) may be determined by selecting one of the fuel supply amount $P_{PID}(s)$ and the fuel supply amount $P_E(s)$ depending on the type of power generation mode in the power generation section 10.

Next, a description will be given in detail of action and effect of the fuel cell system of this embodiment. Basic operation of the fuel cell system is similar to that of the first embodiment, and thereby only the control operation for fuel supply by the control section 36 will be described.

Figure 18:
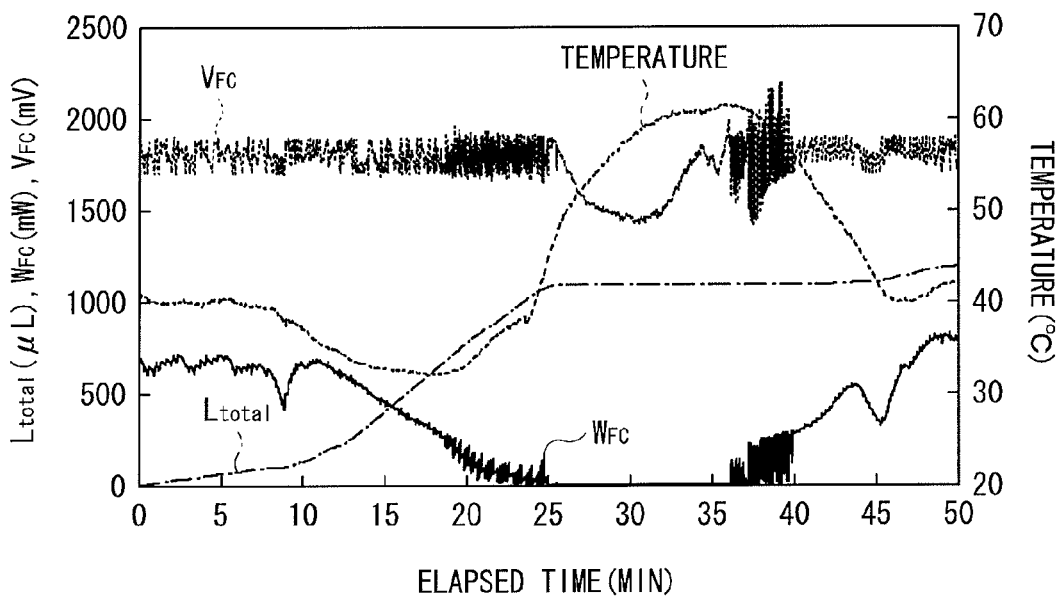
FIG. 18 is a characteristics diagram for explaining high heat generation that may possibly occur in the fuel supply control according to the first embodiment.

First, in the forgoing control section 35 of the first embodiment, for example, in the case where the fuel cell 1 that is generating power is suddenly cooled, a large high heat generation phenomenon may possibly occur, as illustrated in FIG. 18 for example, for the following reason. That is, since the target temperature is constant at all times, if the fuel cell 1 is continuously cooled from the outside and cannot reach the target temperature, the control section 35 attempts to approach the target temperature even by performing excessive fuel supply and causing a crossover phenomenon. In other words, although the fuel cell 1 is in a situation where power is not able to be generated, this situation is not recognized.

Figure 19:
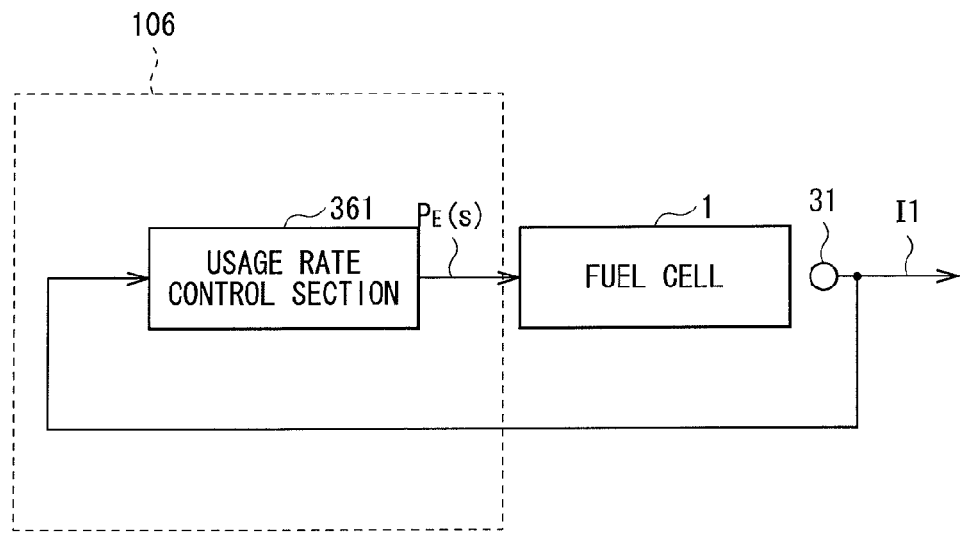
FIG. 19 is a block diagram for explaining a detailed structure of the control section according to a comparative example 4.
Figure 22:
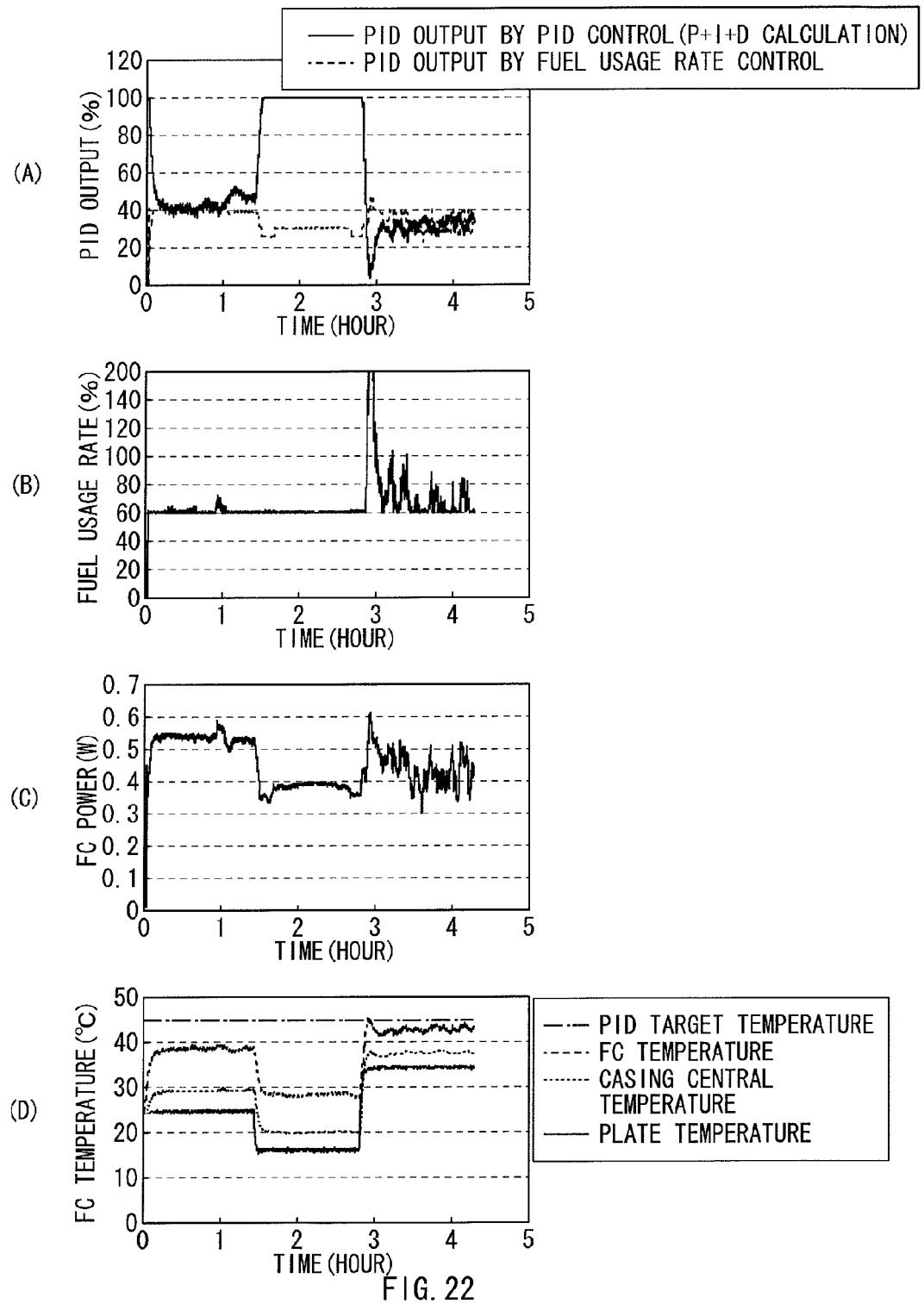
FIG. 22 is a characteristics diagram illustrating another example of power generation characteristics by the fuel supply control according to the second embodiment.
Figure 23:
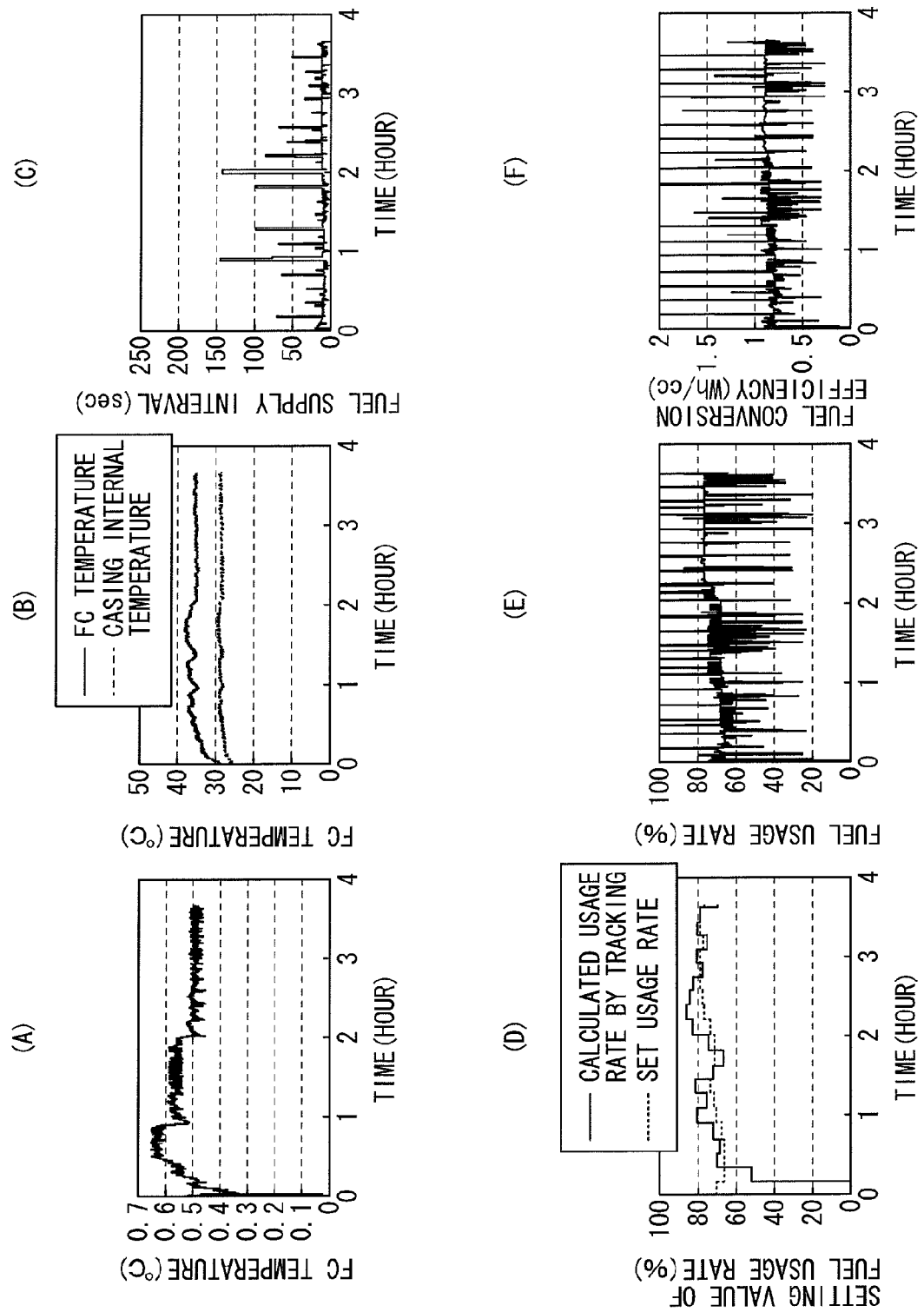
FIG. 23 is a characteristics diagram illustrating an example of power generation characteristics by the fuel supply control according to a variation example of the second embodiment.

Thereby, for example, such as in a control section 106 (comparative example 4) illustrated in FIG. 19, providing the foregoing usage rate control section 361 in the control section 106, and adjusting the supply amount $P_E(s)$ of the liquid fuel so that the calculated usage rate of fuel becomes constant can be considered. According to this, for example, even if sudden cooling and the like occur, it is thought that the changes in the environment are able to be followed.

In the fuel supply control of the comparative example 4, for example, as illustrated in FIG. 20(A) to FIG. 20(C), it is clear that power generation is able to be continued without decrease in the usage rate (maintained at about 50%) even if cooling is performed by sending air around the power generation section 10 during power generation (when sudden cooling occurs). However, as illustrated in FIG. 20(C), the temperature of the power generation section 10 rises to a maximum of almost 60° C., and a high temperature phenomenon occurs.

Meanwhile, in the control section 36 of this embodiment, the final fuel supply amount $P(s)$ is determined taking into consideration both the fuel supply amount $P_{PID}(s)$ calculated based on the temperature T1 of the power generation section 10 in the PID control section 351 and the heat generation correction section 352, and the fuel supply amount $P_E(s)$ calculated based on the usage rate of fuel in the usage rate control section 361. In other words, the advantage of the PID control in which the temperature of the power generation section 10 becomes constant and the advantage of the usage rate control in which the usage rate in the power generation section 10 becomes constant are both used, and respective disadvantages are cancelled out.

In result, for example, in the case where sudden cooling or the like occurs, the high heat generation phenomenon in the PID control is prevented since the usage rate E of the power generation section 10 becomes constant, and the high temperature phenomenon in the usage rate control is prevented since an upper limit is provided for the temperature of the power generation section 10.

Thus, for example, as illustrated in FIG. 21(A) to FIG. 21(D), it is clear that, even if air is sent around the power generation section 10 and the power generation section 10 is suddenly cooled, abnormal heat generation resulting from crossover does not occur and stable power generation is performed. In addition, for example, as illustrated in FIG. 22(A) to FIG. 22(D), it is clear that, even if the bottom of the power generation section 10 is directly cooled, abnormal heat generation resulting from crossover similarly does not occur and stable power generation is similarly performed.

As described above, in this embodiment, the final fuel supply amount $P(s)$ is determined taking into consideration both the fuel supply amount $P_{PID}(s)$ calculated based on the temperature T1 of the power generation section 10 in the PID control section 351 and the heat generation correction section 352, and the fuel supply amount $P_E(s)$ calculated based on the usage rate E of the fuel in the usage rate control section 361. Thereby, the high heat generation phenomenon in the PID control and the high temperature phenomenon in the usage rate control are able to be prevented. Thus, compared to the first embodiment, stable power generation is able to be performed even under further various external environment changes.

Specifically, in the minimum value selection section 362, the final fuel supply amount $P(s)$ is determined by selecting the smaller supply amount value of the fuel supply amount $P_{PID}(s)$ and fuel supply amount $P_E(s)$. Thereby, the foregoing effect is able to be obtained.

Further, the upper limit value (Tmax) of the temperature and the lower limit value (Emin) of the usage rate of the power generation section 10 are able to be prescribed by combining the PID control and the usage rate control, and a stable and robust power generation operation is able to be actualized against various disturbances.

Variation Example of the Second Embodiment

In the fuel supply control of the second embodiment (combination of the PID control and the usage rate control), when the setting of the lower limit value of the usage rate E is unsuitable, it is possible sufficient power generation output is not able to be obtained or, conversely, fuel is wastefully consumed. Specifically, as cases where the setting of the lower limit value of the usage rate E is unsuitable, for example, a case where the setting of the lower limit value of the usage rate E is unsuitable for the external environment and the like, and a case where the fuel supply amount per one operation of the fuel pump 42 changes resulting from failure in the fuel supply system and the like are given. Thereby, the setting value (here, the lower limit value) of the usage rate E of the fuel is preferably (dynamically) updated periodically according to the environment in the control section 36. Specifically, for example, the fuel is completely consumed every ten minutes and, in addition, a raw power value of the usage rate E of the fuel in the last ten minutes is calculated each time. Then, the lower limit value of the usage rate E is automatically updated so that the calculated usage rate E is maintained even during the next ten minutes.

In this case, for example, as illustrated in FIG. 23(A) to FIG. 23(F), not only safety, but also energy conversion efficiency η (fuel economy) is able to be optimized.

Third Embodiment

Figure 24:
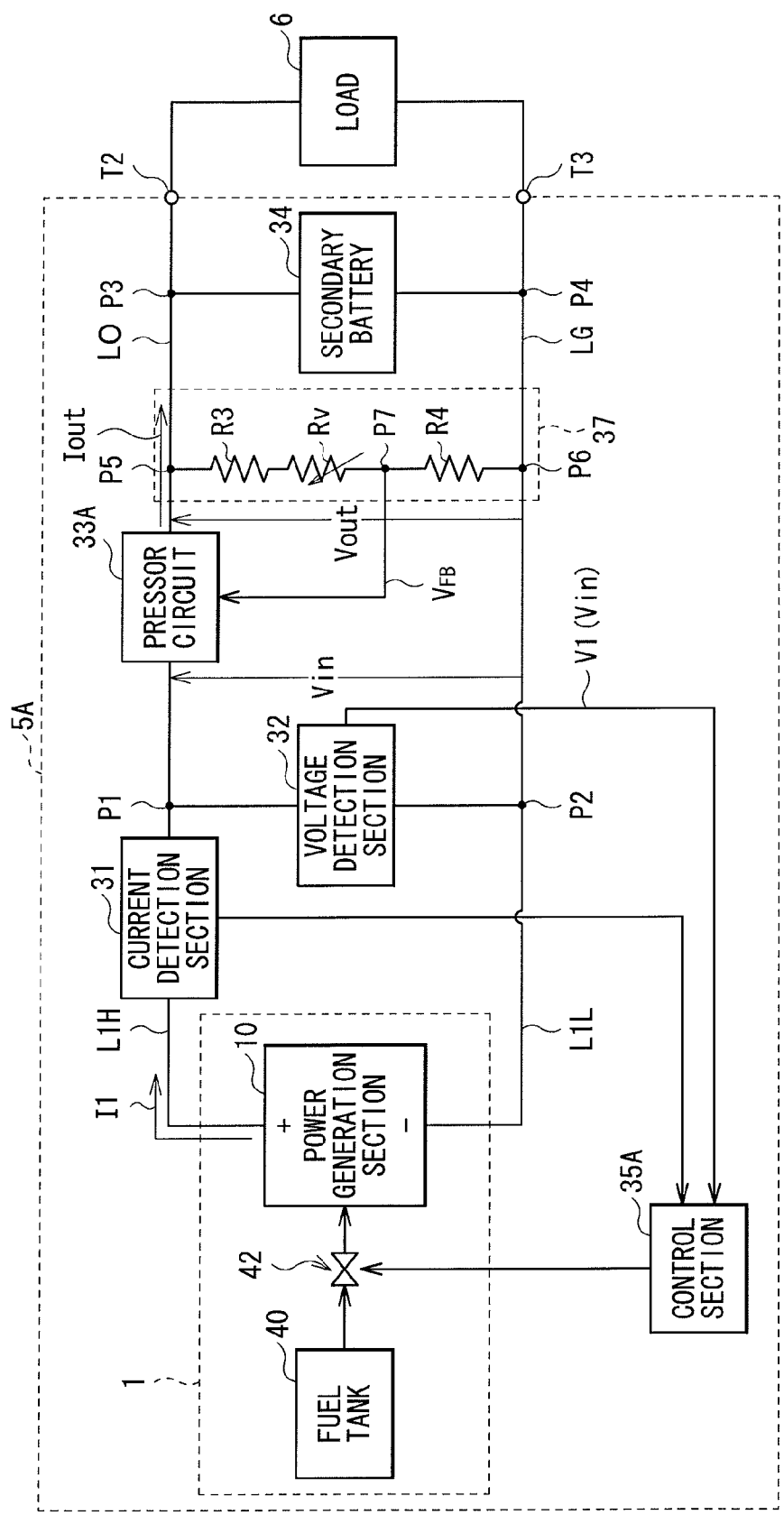
FIG. 24 is a diagram illustrating a whole structure of a fuel cell system according to a third embodiment.

FIG. 24 illustrates a whole structure of a fuel cell system (fuel cell system 5A) of a third embodiment. The fuel cell system 5A supplies electric power for driving the load 6 through the output terminals T2 and T3. The fuel cell system 5A is composed of the fuel cell 1, the current detection section 31, the voltage detection section 32, a boost circuit 33A, a voltage division circuit 37, the secondary battery 34, and a control section 35A. The same symbols are affixed to the elements similar to those of the foregoing first and second embodiments, and the description thereof will be omitted as appropriate.

The voltage detection section 32 is arranged between the connection point P1 on the connection line L1H and the connection point P2 on the connection line L1L. The voltage detection section 32 is intended to detect the power generation voltage V1 of the power generation section 10 (input voltage Vin of the boost circuit 33A). The voltage detection section 32 includes, for example, a resistor.

Figure 25:
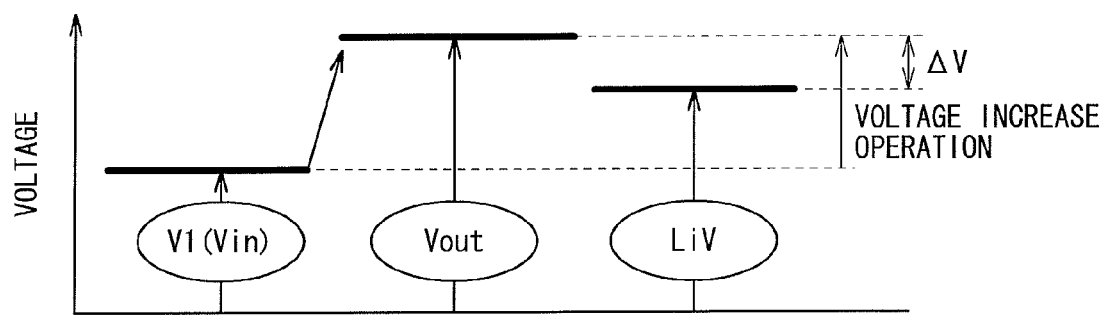
FIG. 25 is a schematic diagram for explaining operation of the boost circuit illustrated in FIG. 24.

The boost circuit 33A is arranged between the connection point P1 of the connection line L1H and a connection point P5 on the output line LO. The boost circuit 33A is a voltage converter that raises the level of the power generation voltage V1 (DC input voltage Vin) of the power generation section 10 and generates a DC output voltage Vout. The boost circuit 33A includes, for example, a DC/DC converter. The boost circuit 33A performs a voltage raising operation according to a potential comparison result of a divided voltage $V_{FB}$ generated by the voltage division circuit 37, described hereafter, and a given reference voltage (reference voltage Vref, described hereafter). As a result of such voltage raising operation by the boost circuit 33A, for example, as illustrated in FIG. 25, the output voltage Vout is able to become greater than a terminal voltage LiV of the secondary battery 34 and a potential difference ΔV is able to be generated. Thereby, a charging operation of the secondary battery 34 is able to be performed. Further, a value of the output current Iout from the boost circuit 33A at this time is determined by the foregoing potential difference ΔV and an internal resistance value of the secondary battery 34. For the detailed structure and detailed operation of the boost circuit 33A, a description will be given later.

The voltage division circuit 37 is arranged between the connection point P5 on the output line LO and a connection point 6 on the ground line G, and is composed of resistors R3 and R4, and a variable resistor Rv. One end of the resistor R3 is connected to the connection point P5, and the other end is connected to one end of the variable resistor Rv. In addition, the other end of the variable resistor Rv is connected to one end of the resistor R4 at a connection point P7. Further, the other end of the resistor R4 is connected to the connection point P6. In this case, the voltage division circuit 37 feeds back to the boost circuit 33A the divided voltage $V_{FB}$ (feedback voltage) of the output voltage Vout from the boost circuit 33A generated between the connection points P6 and P7. For details on the feedback operation, a description will be given later.

The secondary battery 34 is arranged between the connection point P3 on the output line LO and a connection point P4 on the ground line LG. The secondary battery 34 is intended to perform electric storage based on the DC output voltage Vout (load voltage) generated by the boost circuit 33A and the output current Iout (load current) from the boost circuit 33A. The secondary battery 34 is composed of, for example, a lithium ion secondary battery or the like.

The control section 35A is intended to adjust the supply amount of the liquid fuel from the fuel pump 42 based on the power generation current (detected current) I1 detected by the current detection section 31 and the power generation voltage (detected voltage) V1 (input voltage Vin) detected by the voltage detection section 32. Further, the control section 35A is intended to perform control on the output voltage Vout (load voltage) and the output current Iout (load current) supplied from the boost circuit 33A to a load (the secondary battery 34 and the load 6) by controlling the voltage raising operation of the boost circuit 33A using an after-mentioned given control table. Such a control section 35A is composed of a micro computer or the like. For details on the control operation for the output voltage Vout and the output current Iout by the control section 35A, a description will be given later.

Figure 26:
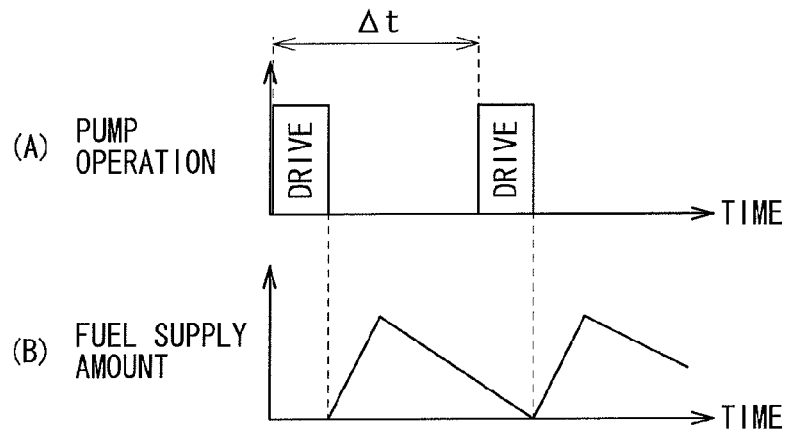
FIG. 26 is a timing waveform diagram for explaining summary of the vaporized fuel supply method.

The fuel pump 42 includes, for example, a piezoelectric body (not illustrated), a piezoelectric body support resin section (not illustrated) for supporting the piezoelectric body, and a flow path (not illustrated) as a pipe to connect the fuel tank 40 with the nozzle 43. For example, as illustrated in FIGS. 26(A) and (B), the fuel pump 42 is able to adjust the supply amount of the fuel according to a change in the fuel supply amount per one operation or a change in the fuel supply cycle Δt. The fuel pump 42 corresponds to a specific example of a "fuel supply section".

Figure 27:
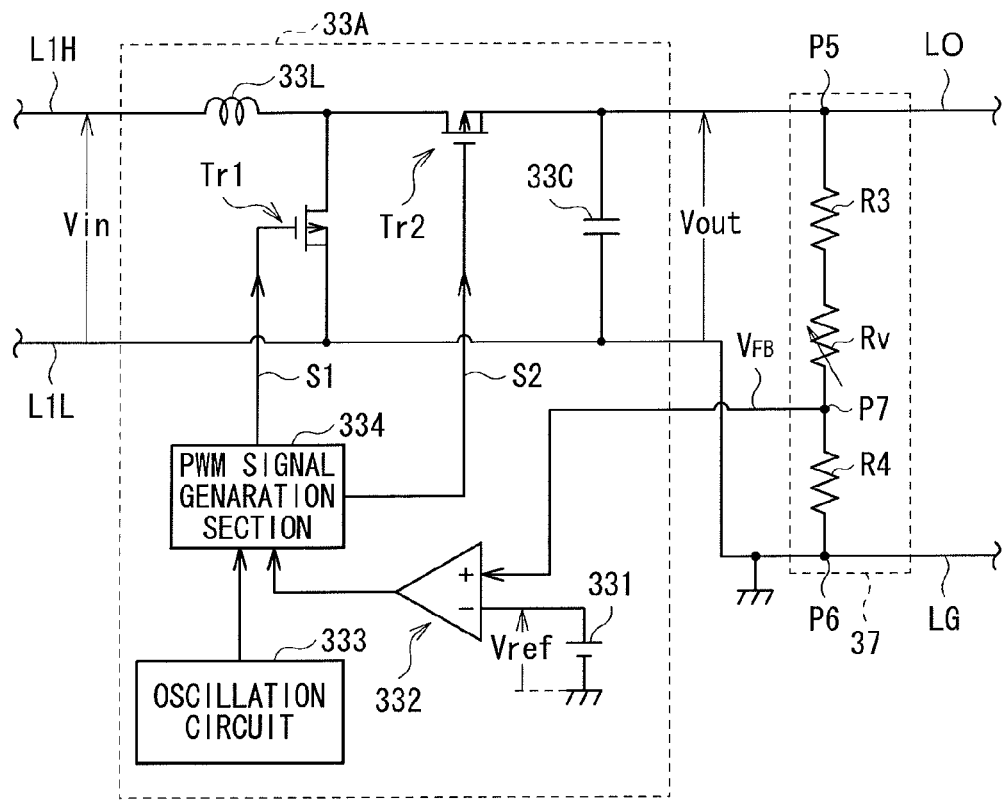
FIG. 27 is a circuit diagram illustrating the structures of the boost circuit and the voltage division circuit illustrated in FIG. 24.
Figure 28:
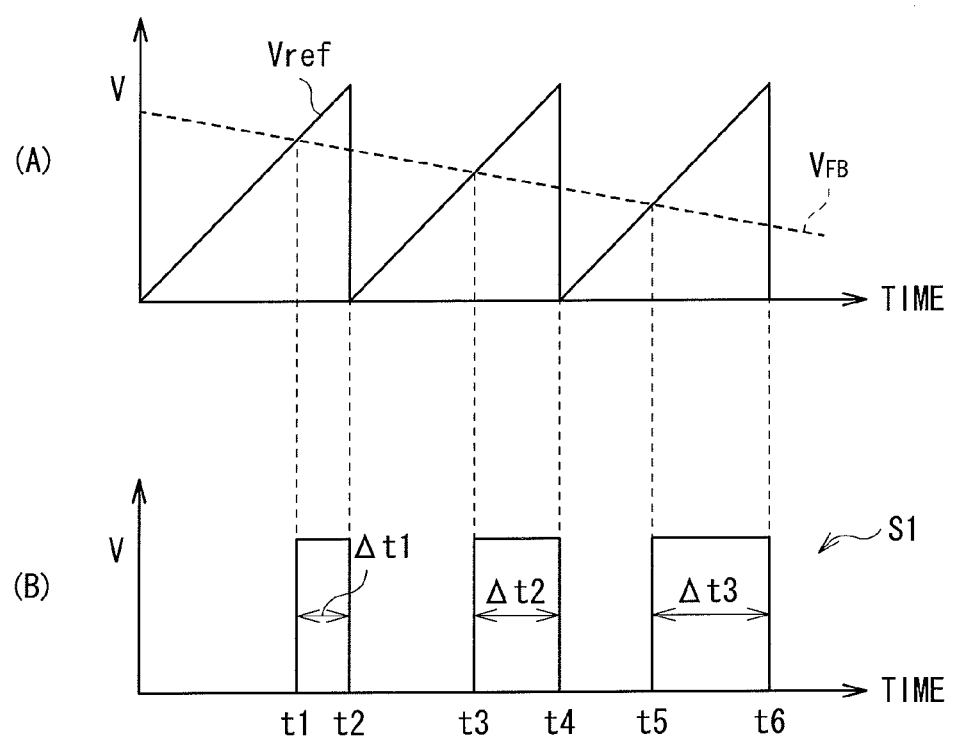
FIG. 28 is a timing waveform diagram for explaining a PWM signal generation operation.

Detailed structures of the boost circuit 33A and the voltage division circuit 37 will be described with reference to FIG. 27 and FIG. 28. FIG. 27 illustrates detailed circuit structures of the boost circuit 33A and the voltage division circuit 37.

The boost circuit 33A is composed of a DC/DC converter, a reference power supply 331, an error amplifier 332, an oscillation circuit 333, and a PWM (pulse width modulation) signal generation section 334. The DC/DC converter is composed of an inductor 33L, a capacitor 33C, and two switching elements Tr1 and Tr2.

The DC/DC converter is a voltage converter that raises the level of the power generation voltage V1 of the power generation section 10 (DC input voltage Vin) and generates the DC output voltage Vout. In the DC/DC converter, the inductor 33L is inserted and arranged on the connection line L1H. In addition, the switching element Tr1 is arranged between the connection line L1H and the connection line L1L, the switching element Tr2 is inserted and arranged on the connection line L1H and the output line LO, and the capacitor 33C is arranged between the output line LO and the ground line LG.

Here, the switching elements Tr1 and Tr2 are each composed of, for example, an N-channel MOS-FET (metal oxide semiconductor-field effect transistor). Control signals (PWM signals) S1 and S2 output from the after-mentioned PWM signal generation section 334 are supplied to gate terminals of the switching elements Tr1 and Tr2, and respective switching operations are controlled.

The reference power supply 331 is a power supply for supplying the reference voltage Vref of the error amplifier 332.

The error amplifier 332 compares the divided voltage $V_{FB}$ supplied by the voltage division circuit 37 and the reference voltage Vref supplied by the reference power supply 331 for large and small potential difference, and outputs the comparison result ("H (high)" or "L (low)" signal) to the PWM signal generation section 334.

The oscillation circuit 333 generates a pulse signal used for generating the PWM signal in the PWM signal generation section 334 and supplies the generated pulse signal to the PWM signal generation section 334.

The PWM signal generation section 334 generates the control signals S1 and S2 of the switching elements Tr1 and Tr2 composed of PWM signals based on the comparison result in the error amplifier 332 and the pulse signal supplied from the oscillation circuit 333. Specifically, for example, as illustrated in FIGS. 28(A) and (B), in the case where the divided voltage $V_{FB}$ has a greater potential than the reference voltage Vref composed of a saw-shaped waveform, PWM signals (the control signal S1) having a pulse width are generated during this period. In addition, at this time, as indicated by pulse widths Δt1 to Δt3 in the figure, the pulse width of the control signal S1 becomes smaller as the potential of the divided voltage $V_{FB}$ becomes greater and, conversely, the pulse width of the control signal S1 becomes greater as the potential of the divided voltage $V_{FB}$ becomes smaller.

The fuel cell system 5A of this embodiment is able to be manufactured, for example, as follows.

First, the fuel cell 1 is formed in a similar manner to the method described in the foregoing first embodiment. Then, the foregoing current detection section 31, voltage detection section 32, boost circuit 33A, voltage division circuit 37, secondary battery 34, and control section 35A are each electrically connected and attached to the fuel cell 1, as illustrated in FIG. 24. In result, the fuel cell system 5A illustrated in FIG. 24 and FIG. 25 is formed.

Next, a description will be given in detail of action and effect of the fuel cell system 5A of this embodiment.

In the fuel cell system 5A, as the entire fuel cell 1, reaction shown in Expression (7) is generated in a manner similar to that in the first embodiment, and power generation is performed.

Thereby, part of chemical energy of the liquid fuel 41, that is, methanol is converted to electric energy, which is collected by the connection member 20 and is extracted as a current (power generation current I1) from the power generation section 10. The level of the power generation voltage (DC voltage) V1 (input voltage Vin) based on the power generation current I1 is raised (voltage conversion) by the boost circuit 33A and becomes the DC voltage (output voltage) Vout. The output voltage Vout (load voltage) and the output current Iout (load current) from the boost circuit 33A are supplied to the secondary battery 34 or a load (for example, an electronic device body). Then, in the case where the output voltage Vout and the output current Iout are supplied to the secondary battery 34, the secondary battery 34 is charged based on the voltage and the current. Meanwhile, in the case where the output voltage Vout and the output current Iout are supplied to the load 6 through the output terminals T2 and T3, the load 6 is driven, and given operation is made.

At this time, in the fuel pump 42, the fuel supply amount per one operation or the fuel supply cycle Δt is controlled by the control section 35A and, accordingly, the fuel supply amount is adjusted.

Figure 29:
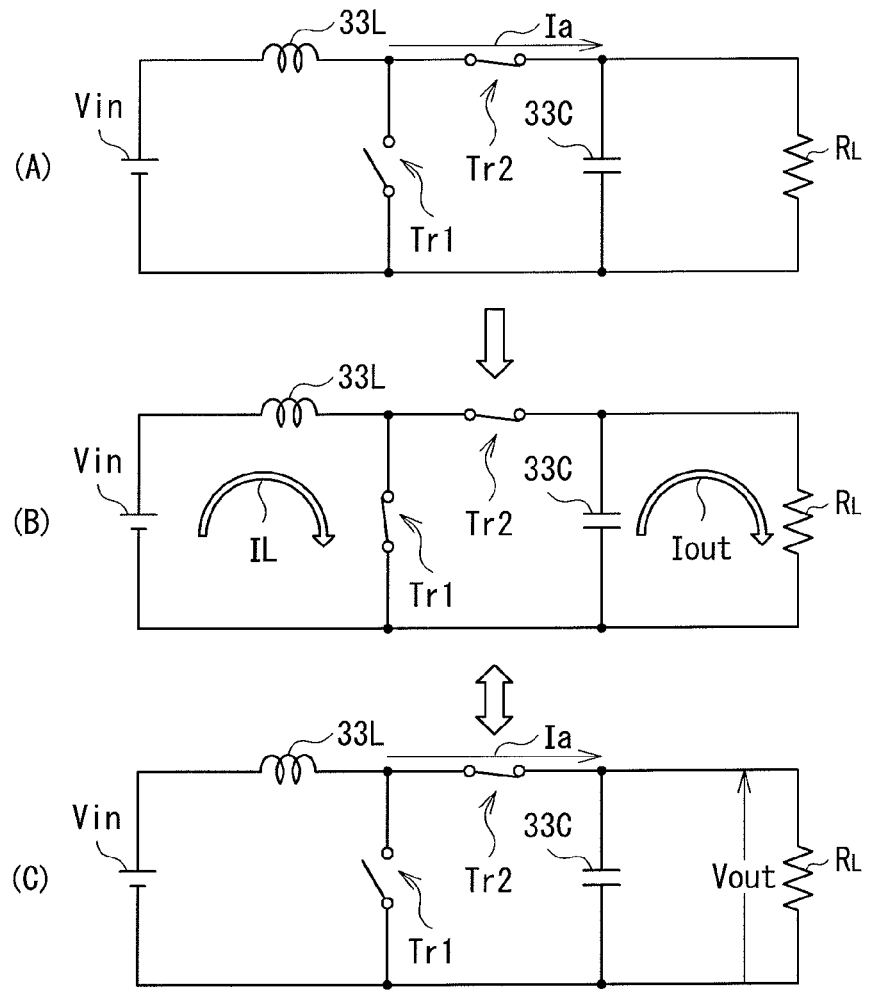
FIG. 29 is a circuit diagram for explaining operation of the boost circuit illustrated in FIG. 27.
Figure 30:
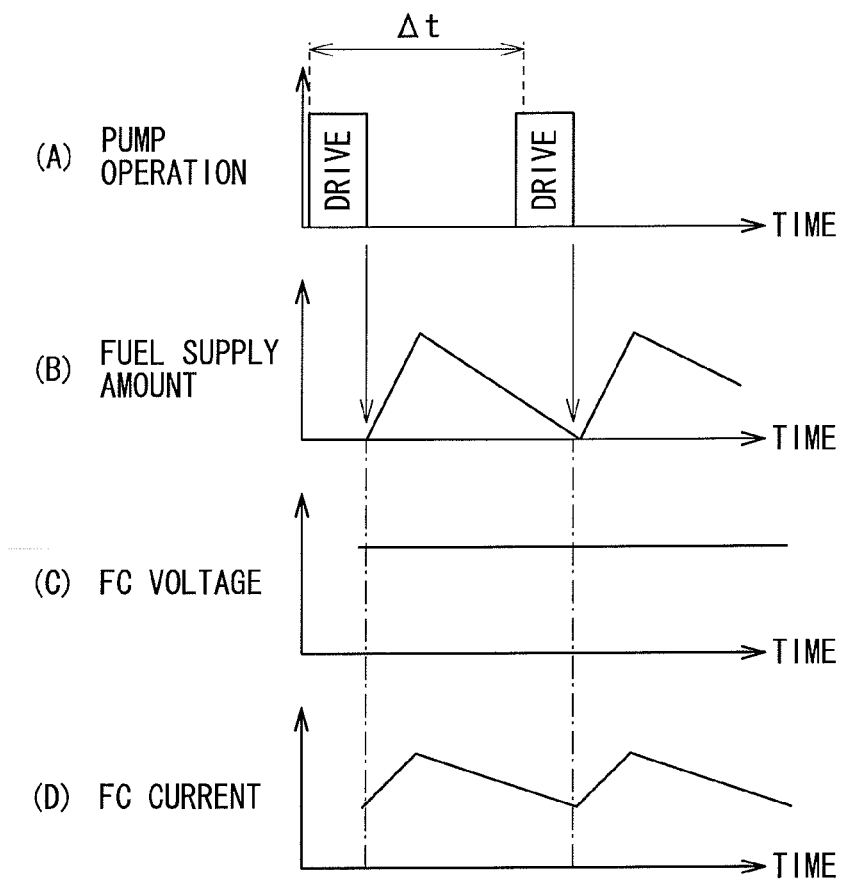
FIG. 30 is a timing waveform diagram for explaining a constant voltage operation according to the third embodiment.
Figure 31:
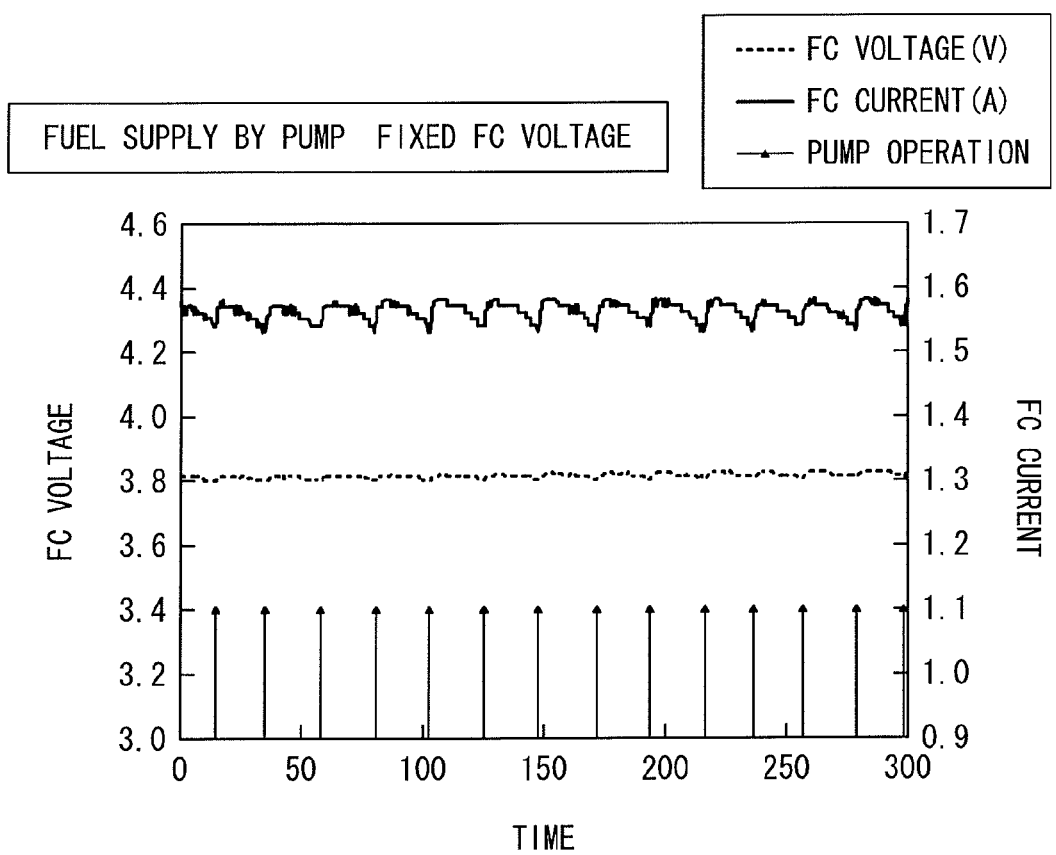
FIG. 31 is a characteristics diagram illustrating an example of the constant voltage operation according to the third embodiment.
Figure 32:
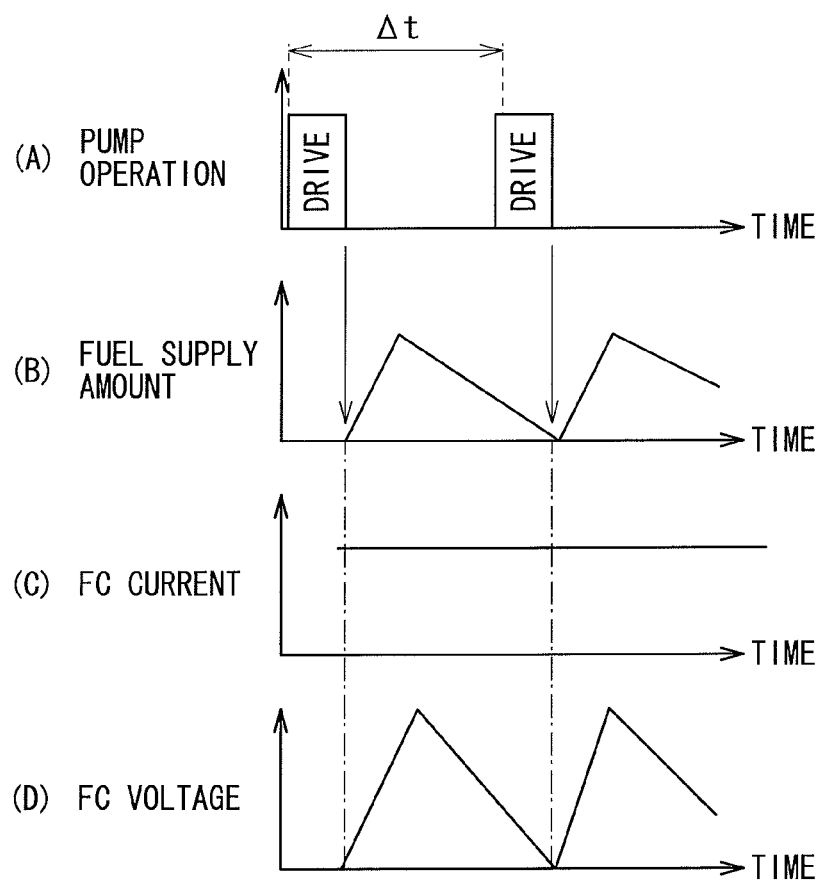
FIG. 32 is a timing waveform diagram for explaining a constant current operation according to the third embodiment.
Figures 33, 34:
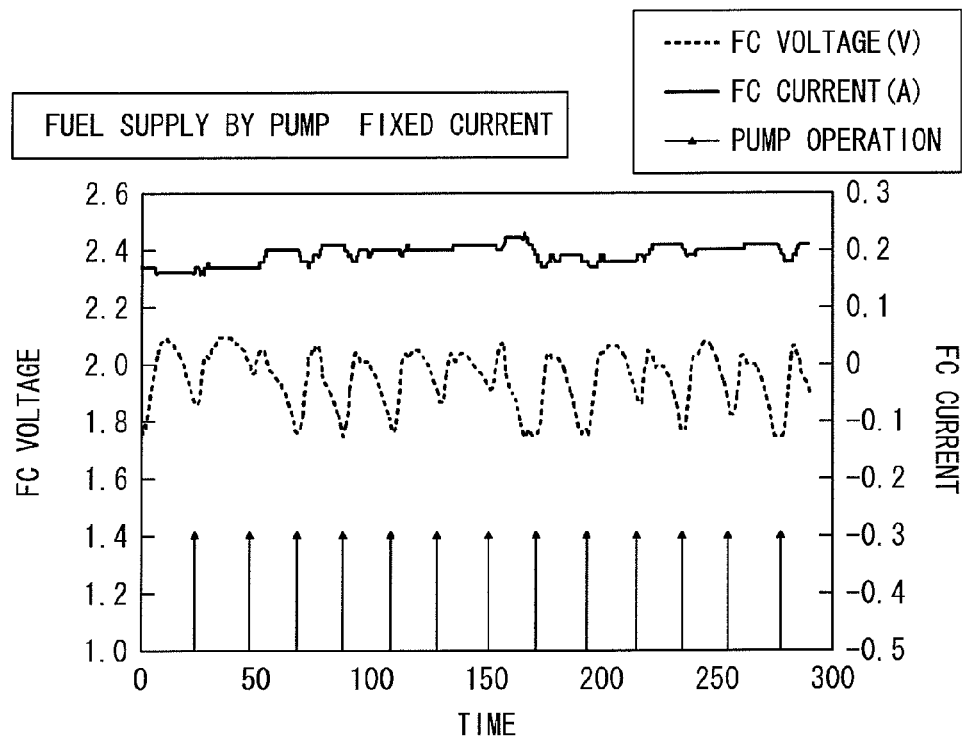
FIG. 33 is a characteristics diagram illustrating an example of the constant current operation according to the third embodiment.
FIG. 34 is a diagram illustrating an example of a control table used in the constant voltage operation or the constant current operation according to the third embodiment.

In addition, at this time, in the boost circuit 33A of this embodiment, more specifically, a voltage raising operation such as that illustrated in FIG. 29(A) to FIG. 29(C), for example, is performed. FIG. 29(A) to FIG. 29(C) illustrate the voltage raising operation of the boost circuit 33A using a circuit state diagram. The section of the foregoing DC/DC converter in the boost circuit 33A is extracted and illustrated. However, the input voltage Vin is illustrated as a power supply for convenience, and the load connected to the output side is illustrated as a load resistor $R_L$ for convenience. Further, to make the ON and OFF state of the switching elements Tr1 and Tr2 more understandable, the switching elements Tr1 and Tr2 are illustrated in the shape of a switch for convenience.

In the DC/DC converter in the boost circuit 33A, first, as illustrated in FIG. 29(A), when the input voltage Vin is supplied, a current Ia composed of the current flow path illustrated in the figure flows to the inductor 33L. At this time, the switching element Tr1 is in an OFF state and the switching element Tr2 is in an ON state.

Next, as illustrated in FIG. 29(B), when the switching element Tr1 enters the ON state, a current IL flowing to the inductor 33L and the switching element Tr1 becomes greater than the output current Iout flowing to the load resistor $R_L$. The current IL increases in this way, and therefore large energy is stored in the inductor 33L.

Next, as illustrated in FIG. 29(C), when the switching element Tr1 once again enters the OFF state, the current Ia composed of the current flow path illustrated in the figure flows. At this time, since a current by the energy stored in the inductor 33L is superimposed on the current Ia, the output voltage Vout supplied to the load resistor $R_L$ is expressed by a following Equation (9), in the case where the voltage generated at the inductor 33L is VL. In addition, at this time, the capacitor 33C is simultaneously charged until the voltage between both ends reaches the output voltage Vout.

$$Vout = Vin + VL \quad (9)$$

Then, by subsequently repeating the operations in FIG. 29(B) and FIG. 29(C), an output voltage Vout that is a higher voltage than the input voltage Vin is generated (voltage raising operation is performed) and supplied to the load resistor $R_L$.

In addition, at this time, the divided voltage $V_{FB}$ of the output voltage Vout such as that illustrated in FIG. 28(A) is fed back to the boost circuit 33A by the voltage division circuit 37. Further, in the PWM signal generation section 334, the control signals S1 and S2 for the switching elements Tr1 and Tr2 composed of the PWM signals, such as those illustrated in FIG. 28(B), are generated based on the comparison result in the error amplifier 332 and the pulse signal supplied from the oscillation circuit 333. At this time, the pulse width of the control signal S1 becomes smaller as the potential of the divided voltage $V_{FB}$ becomes greater and, conversely, the pulse width of the control signal S1 becomes greater as the potential of the divided voltage $V_{FB}$ becomes smaller.

Thus, in the case where the output voltage Vout is low, the operation is that in which the pulse width of the control signal S1 increases and the output voltage Vout is increased. Meanwhile, in the case where the output voltage Vout is high, the operation is that in which the pulse width of the control signal S1 decreases and the output voltage Vout is decreased. Thereby, control is performed so that the output voltage Vout (load voltage) is constant (constant voltage operation) by controlling the divided voltage $V_{FB}$ to become equal with the reference voltage Vref.

Specifically, the constant voltage operation is performed as illustrated in FIGS. 30(A) to (D) and FIG. 31, for example. In other words, in a state in which the output voltage Vout (FC voltage, power generation voltage) is fixed to a constant value, the output current Iout (FC current, power generation current) increases immediately after the liquid fuel 41 is supplied by the fuel pump 42 and the FC current gradually decreases with the decrease in liquid fuel 41. A reason for this is that the amount of power capable of being generated by the power generation section 10 with a constant amount of liquid fuel 41 is also a constant value. Thereby, as the intermittently supplied liquid fuel 41 is consumed by power generation in the power generation section 10, the FC current from the power generation section 10 decreases.

In addition, in this embodiment, for example, by feeding back to the boost circuit 33A the voltage corresponding to the power generation current (input current) I1, operation control of the boost circuit 33A is also able to be performed (constant current operation) so that the output current Iout (load current) becomes constant.

In this case, specifically, the constant current operation is performed as illustrated in FIGS. 32(A) to (D) and FIG. 33, for example. In other words, in this case, the liquid fuel 41 increases immediately after the liquid fuel 41 is supplied by the fuel pump 42. Thereby, in the state in which the output current Iout (FC current, power generation current) is fixed to a constant value, the output voltage Vout (FC voltage, power generation voltage) increases according to the supply amount of the liquid fuel 41. Meanwhile, the FC voltage decreases as the liquid fuel 41 decreases.

Here, in this embodiment, in such constant voltage operation and constant current operation, the voltage raising operation of the boost circuit 33A is controlled in the control section 35A by using a control table, such as that illustrated in FIGS. 34(A) to (C).

Specifically, for example, in the case where the control table illustrated in FIG. 34(A) is used, operation control of the boost circuit 33A is performed so that the setting value of the reference voltage Vref increases as the setting value of the output voltage Vout (FC voltage, load voltage) increases. Thereby, the constant voltage operation and the constant current operation according to the setting value of the FC voltage are able to be performed.

In addition, for example, in the case where the control table illustrated in FIG. 34(B) is used, when the supply amount of the liquid fuel 41 from the fuel pump 42 is constant, the magnitudes of the output voltage Vout (FC voltage, load voltage) and the output current Iout (FC current, load current) are adjusted according to the size of the load 6. Thereby, in a state in which the fuel supply amount per unit time is constant, FC voltage and FC current settings according to the load condition are able to be performed.

In addition, for example, in the case where the control table illustrated in FIG. 34(C) is used, operation control of the boost circuit 33A is performed so that the output current Iout (FC current, load current) decreases as the setting value of fuel conversion efficiency in the power generation section 10 increases. Thereby, when the constant voltage operation is performed, the fuel supply amount and the fuel conversion efficiency are able to be optimized.

Thus, in this embodiment, the power generation voltage V1 (input voltage Vin) supplied from the power generation section 10 is increased by the boost circuit 33A and supplied to the load (the secondary battery 34 and the load 6) as the output voltage Vout (load voltage). At this time, the operation of the boost circuit 33A is controlled using a given control table, and therefore the output voltage Vout (load voltage) and the output current Iout (load current) supplied from the boost circuit 33A to the load is controlled.

Further, in this embodiment, as described hereafter, it is more preferable to use the constant voltage control than the constant current control.

Figure 35:
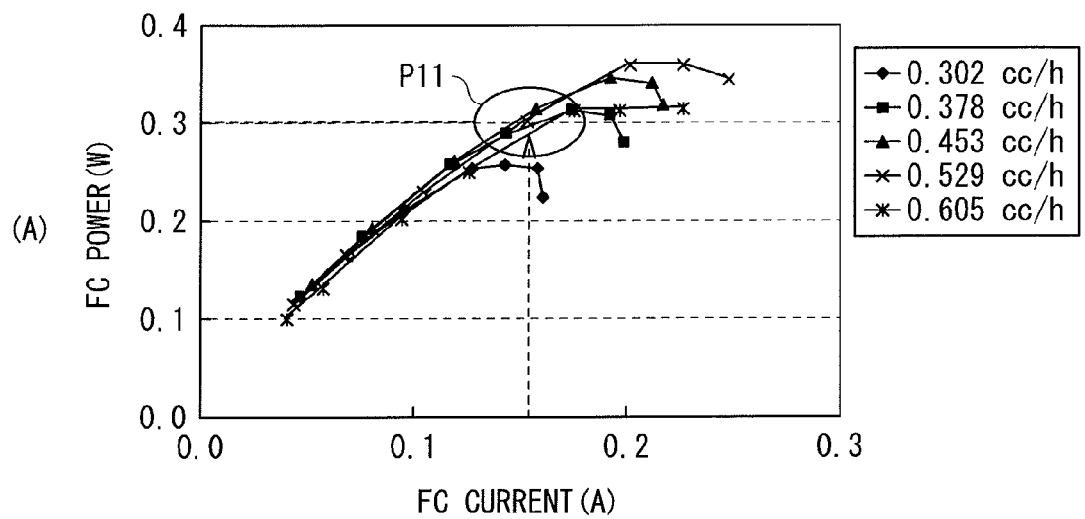
FIG. 35 is a characteristics diagram illustrating an example of relation between generated power and the constant voltage operation or the constant current operation according to the third embodiment.
Figure 35:
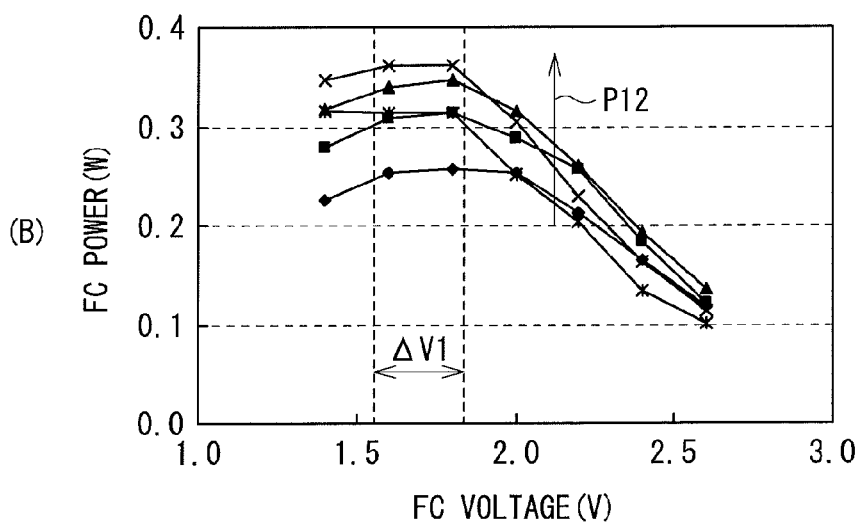

First, a relation between generated power and the constant voltage operation or the constant current operation will be described with reference to FIG. 35.

First, in the constant current operation illustrated in FIG. 35(A), as indicated by a referential symbol P11 in the figure, even if the fuel supply amount (cc/h) per unit time is increased, output power (FC power) does not increase with the fuel increase and is almost constant.

Meanwhile, in the constant voltage operation illustrated in FIG. 35(B), as indicated by an arrow P12 in the figure, the output power (FC power) is able to be increased by increasing the fuel supply amount (cc/h) per unit time. It is also clear that the width (voltage range) of the FC voltage $\Delta V1$ capable of obtaining maximum power is of a certain size. In result, by generating power in a state in which the FC voltage is a constant value, power generation is able to be performed in a state in which a proportional relationship is established between the FC power and the fuel supply amount.

Figure 36:
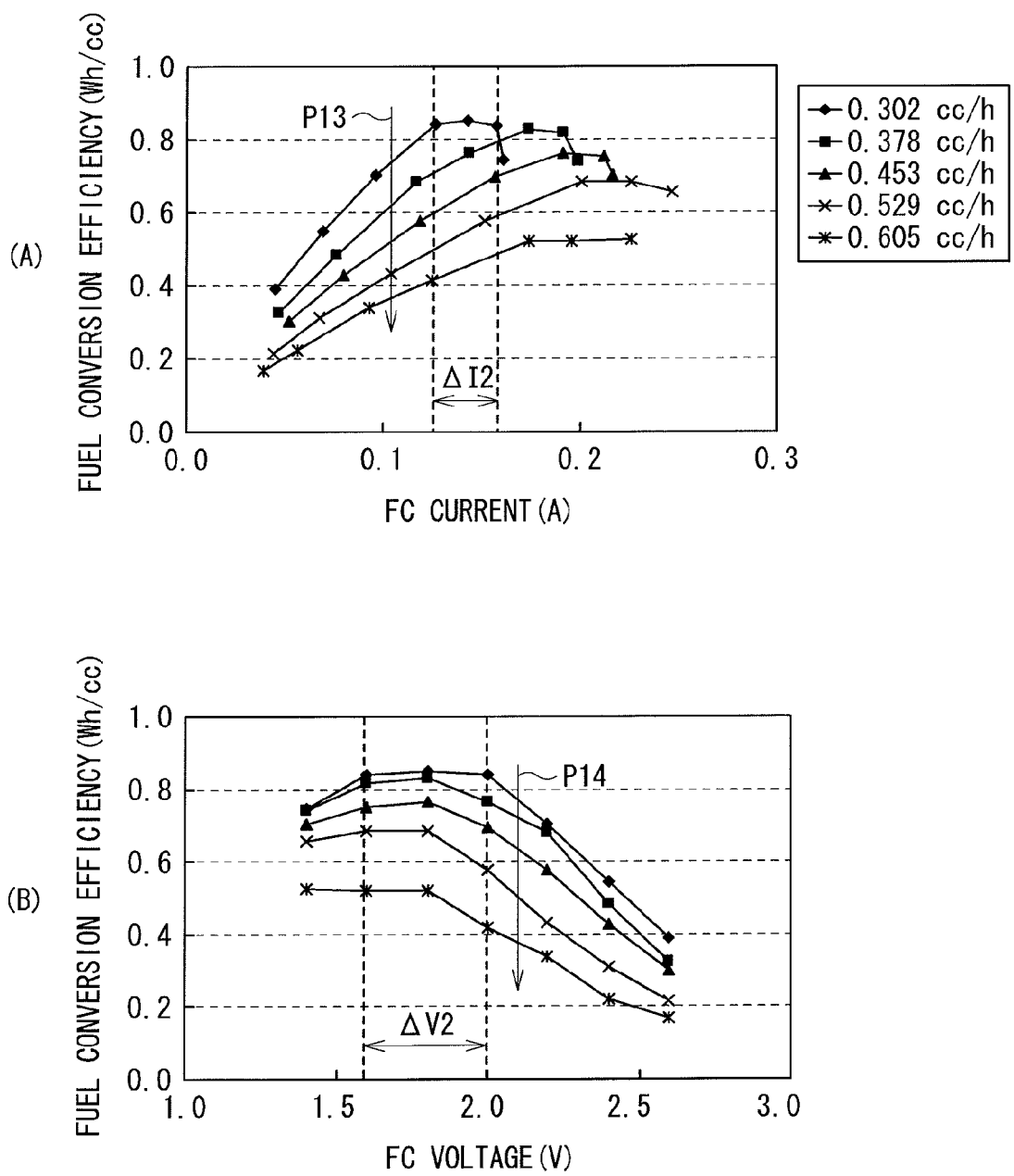
FIG. 36 is a characteristics diagram illustrating an example of relation between fuel conversion efficiency and the constant voltage operation or the constant current operation according to the third embodiment.

Next, a relation between fuel conversion efficiency and the constant voltage operation or the constant current operation will be described with reference to FIG. 36.

First, in the constant current operation illustrated in FIG. 36(A), as indicated by an arrow P13 in the figure, the fuel conversion efficiency is at the highest when the fuel supply is performed at a rate of 0.302(cc/h) (when the fuel supply amount is the smallest in the figure). However, the current value width $\Delta I2$ when the fuel conversion efficiency is at the highest value is narrow and, further, the fuel conversion efficiency suddenly deteriorates when the current value width $\Delta I2$ is exceeded.

Meanwhile, in the constant voltage operation illustrated in FIG. 36(B), the voltage value width $\Delta V2$ when the fuel conversion efficiency is at the highest value is wide. In this case as well, as indicated by an arrow P14 in the figure, the fuel conversion efficiency is at the highest when the fuel supply is performed at a rate of 0.302(cc/h) (when the fuel supply amount is the smallest in the figure). In addition, as described above, since the FC power is able to be changed according to the fuel supply amount per unit time, by performing power generation in a state in which the FC voltage is a constant value, power generation in a state in which the proportional relation is established between the FC power and the fuel supply amount, and power generation in a state in which fuel conversion efficiency is high become possible at the same time.

Thereby, in the case where operation control of the boost circuit 33A is performed so that the output voltage Vout (load voltage, FC voltage) becomes constant (where control is performed to perform constant voltage operation), the power generation state of the fuel cell 1 in particular is able to be made favorable.

Thus, in this embodiment, the power generation voltage V1 (input voltage Vin) supplied from the power generation section 10 is increased by the boost circuit 33A and the operation of the boost circuit 33A is controlled using a given control table in the control section 35A, and therefore control is performed on the output voltage Vout (load voltage) and the output current Iout (load current) supplied from the boost circuit 33A to the load (the secondary battery 34 and the load 6). Thus, even in the case where intermittent fuel supply is performed in the vaporization supply type fuel cell 1, efficient control of the output voltage Vout and the output current Iout is actualized. In result, power generation that is more stable than in the past is able to be performed in the vaporization supply type fuel cell.

In addition, in the case where operation control of the boost circuit 33A is performed so that the output voltage Vout (load voltage) becomes constant (where control is performed to perform constant voltage operation), the power generation state of the fuel cell 1 in particular is able to be made favorable.

In the foregoing first and second embodiments and the variation example thereof, the description has been given of the case that control is performed so that the temperature of the power generation section 10 becomes constant (PID control is performed) by proportioning the supply amount of the liquid fuel with the time integral and the time derivative of the difference value between the target temperature Tsv(s) and the detected temperature Tpv(s). However, for example, control may be performed so that the temperature of the power generation section 10 becomes constant using other feedback control, such as P control and PI control, fuzzy control, H$\infty$ control, and the like. Specifically, control may be performed so that the temperature of the power generation section 10 becomes constant (P control is performed) by proportioning the supply amount of the liquid fuel with the difference value between the target temperature Tsv(s) and the detected temperature Tpv(s). Further, control may be performed so that the temperature of the power generation section 10 becomes constant (PI control is performed) by proportioning the supply amount of the liquid fuel with the time integral of the difference value between the target temperature Tsv(s) and the detected temperature Tpv(s). In addition, control may be performed so that the temperature of the power generation section 10 becomes constant (PD control is performed) by proportioning the supply amount of the liquid fuel with the time derivative of the difference value between the target temperature Tsv(s) and the detected temperature Tpv(s).

In addition, in the foregoing first and second embodiments and the variation example thereof, the description has been given of the case that the heat generation correction section 352 calculates the energy conversion efficiency $\eta$ in the power generation section 10 using the power generation voltage (detected voltage) V1 detected by the voltage detection section 32. However, the energy conversion efficiency $\eta$ in the power generation section 10 may be calculated using a previously set given voltage (setting voltage) instead of such a power generation voltage V1.

Further, the circuit structures of the boost circuit 33A and the voltage division circuit 37 are not limited to those described according to the foregoing third embodiment, and may be circuit structures using other methods. In addition, the control table is not limited to those described according to the foregoing third embodiment (FIGS. 34(A) to (C)), and a control table having other structures may be used.

Further, in the foregoing embodiments and the like, the description has been given of the case that the power generation section 10 includes the six unit cells that are electrically connected to each other in series. However, the number of unit cells is not limited thereto. For example, the power generation section 10 may be composed of one unit cell, or may be composed of two or more given plurality of unit cells.

Further, in the foregoing embodiments and the like, air supply to the oxygen electrode 13 is performed by natural ventilation. However, air may be forcefully supplied by using a pump or the like. In this case, oxygen or gas containing oxygen may be supplied instead of air.

Further, in the foregoing embodiments and the like, the description has been given of the case that the fuel tank 40 containing the liquid fuel 41 is built in the fuel cell systems 5 and 5A. However, such a fuel tank may be detachable from the fuel cell system.

Further, in the foregoing embodiments and the like, the description has been given of the direct methanol fuel cell system but can be also applied to other type of fuel cell systems.

The fuel cell system of the present embodiments is able to be suitably used for a mobile electronic device such as a mobile phone, an electronic camera, an electronic databook, and a PDA (Personal Digital Assistants).

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A fuel cell system comprising:
   a power generation section for performing power generation by being supplied a fuel and oxidant gas;
   a fuel supply section for supplying a liquid fuel to the power generation section side and in which a supply amount of the liquid fuel is able to be adjusted;
   a fuel vaporization section for supplying a gas fuel to the power generation section by vaporizing the liquid fuel supplied from the fuel supply section;
   a temperature detection section for detecting temperature of the power generation section;
   a current detection section for detecting a power generation current of the power generation section; and
   a control section comprising a subtraction section, a proportional-integral-derivative (PID) control section, a heat generation correction section, a usage rate control section, and a minimum value selection section, the subtraction section configured to determine a difference value between a target temperature and a temperature detected by the temperature detection section, the PID control section configured to calculate a supply amount of the liquid fuel based on the difference value determined in the subtraction section so that the temperature of the power generation section becomes constant, the heat generation correction section configured to calculate an energy conversion efficiency in the power generation section based on a power generation voltage of the power generation section or a given setting voltage, the usage rate control section configured to calculate a usage rate of fuel in the power generation section based on the power generation current detected by the current detection section, and to calculate the supply amount of the liquid fuel so that the usage rate of fuel becomes constant, and the minimum value selection section configured to determine a final supply amount of the liquid fuel taking into consideration a first fuel supply amount calculated based on the temperature of the power generation section and a second fuel supply amount calculated based on the usage rate of fuel.

2. The fuel cell system according to claim 1, wherein the control section calculates the energy conversion efficiency in the power generation section also taking into consideration a power generation current of the power generation section, in addition to the power generation voltage of the power generation section or the given setting voltage.

3. The fuel cell system according to claim 1, wherein the control section determines the final supply amount of the liquid fuel by selecting one of the first and second fuel supply amounts.

4. The fuel cell system according to claim 3, wherein the control section determines the final supply amount of the liquid fuel by selecting a smaller supply amount value of the first fuel supply amount and the second fuel supply amount.

5. The fuel cell system according to claim 1, wherein the control section periodically updates a setting value of the usage rate of fuel.

6. The fuel cell system according to claim 1, wherein the control section performs control so that the temperature of the power generation section becomes constant by proportioning the supply amount of the liquid fuel with a time integral and a time derivative of a difference value between a setting temperature and the detected temperature of the power generation section.

7. The fuel cell system according to claim 1, wherein the control section performs control so that the temperature of the power generation section becomes constant by proportioning the supply amount of the liquid fuel with a difference value between a setting temperature and the detected temperature of the power generation section.

8. The fuel cell system according to claim 1, wherein the control section performs control so that the temperature of the power generation section becomes constant by proportioning the supply amount of the liquid fuel with a time integral of a difference value between a setting temperature and the detected temperature of the power generation section.

9. The fuel cell system according to claim 1, wherein the control section performs control so that the temperature of the power generation section becomes constant by proportioning the supply amount of the liquid fuel with a time derivative of a difference value between a setting temperature and the detected temperature of the power generation section.

10. An electronic device including a fuel cell system, the fuel cell system comprising:
    a power generation section for performing power generation by being supplied a fuel and oxidant gas;
    a fuel supply section for supplying a liquid fuel to the power generation section side and in which a supply amount of the liquid fuel is able to be adjusted;
    a fuel vaporization section for supplying a gas fuel to the power generation section by vaporizing the liquid fuel supplied from the fuel supply section;
    a temperature detection section for detecting temperature of the power generation section; and
    a control section comprising a subtraction section, a proportional-integral-derivative (PID) control section, a heat generation correction section, a usage rate control section, and a minimum value selection section, the subtraction section configured to determine a difference value between a target temperature and a temperature detected by the temperature detection section, the PID control section configured to calculate a supply amount of the liquid fuel based on the difference value determined in the subtraction section so that the temperature of the power generation section becomes constant, the heat generation correction section configured to calculate an energy conversion efficiency in the power generation section based on a power generation voltage of the power generation section or a given setting voltage, the usage rate control section configured to calculate a usage rate of fuel in the power generation section based on the power generation current detected by the current detection section, and to calculate the supply amount of the liquid fuel so that the usage rate of fuel becomes constant, and the minimum value selection section configured to determine a final supply amount of the liquid fuel taking into consideration a first fuel supply amount calculated based on the temperature of the power generation section and a second fuel supply amount calculated based on the usage rate of fuel.

* * * * *